United States Patent [19]
Sheem

[11] Patent Number: 5,633,968
[45] Date of Patent: May 27, 1997

[54] FACE-LOCK INTERCONNECTION MEANS FOR OPTICAL FIBERS AND OTHER OPTICAL COMPONENTS AND MANUFACTURING METHODS OF THE SAME

[76] Inventor: Sang K. Sheem, P.O. Box 2141, Livermore, Calif. 94551

[21] Appl. No.: 397,939

[22] Filed: Mar. 3, 1995

Related U.S. Application Data

[63] Continuation-in-part of Ser. No. 276,829, Jul. 18, 1994, abandoned.

[51] Int. Cl.$^6$ .................... G02B 6/00; G02B 6/36
[52] U.S. Cl. ........................................ 385/53
[58] Field of Search ........................ 385/53, 54, 55, 385/56, 64, 65, 70, 76, 83

[56] References Cited

U.S. PATENT DOCUMENTS

| | | | |
|---|---|---|---|
| 4,341,439 | 7/1982 | Hodge | 350/96.22 |
| 4,725,114 | 2/1988 | Murphy | 359/96.17 |
| 4,818,058 | 4/1989 | Bonanni | 385/53 |
| 4,830,456 | 5/1989 | Kakii et al. | 385/53 |
| 5,188,539 | 2/1993 | Langdon | 439/341 |
| 5,259,050 | 11/1993 | Yamakawa et al. | 385/59 |
| 5,315,678 | 5/1994 | Maekawa et al. | 385/59 |

*Primary Examiner*—Akm E. Ullah

[57] ABSTRACT

A novel means for interconnecting two optical components is disclosed, in which there are two connecting surfaces with matching surface features, and one optical component is located at a predetermined location on the first surface, and the other optical component is located at a matching location on the second surface. When the two surfaces are mated in a face-to-face fashion, they are locked into a stable position through the matched surface features. The first and the second optical components are aligned properly as they are located at a same spot with respect to the face-locking surface features. The unique surface features and the locations of the optical components may be registered by a lithographic method that has a sub-micron accuracy. Modular approach is feasible in which a combination of face-lock embodiments are stacked together to align a number of optical components. When the surface features has periodic patterns, more than one stable locking positions can be achieved, realizing optical switching capability.

28 Claims, 27 Drawing Sheets

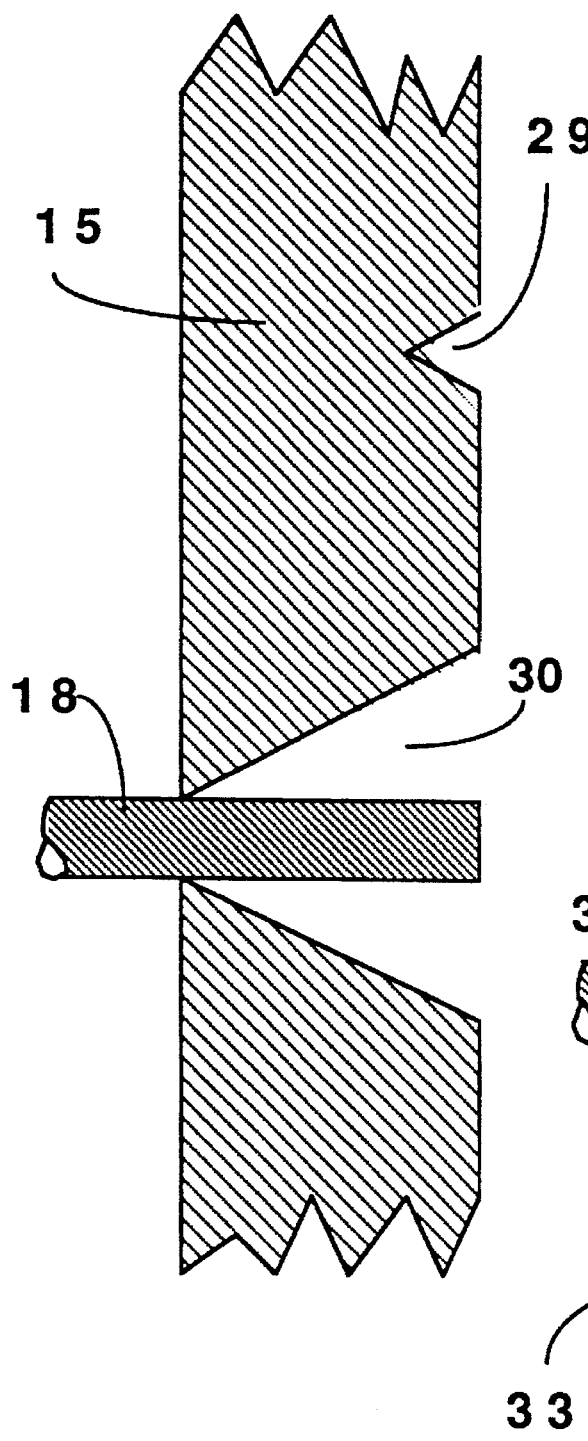
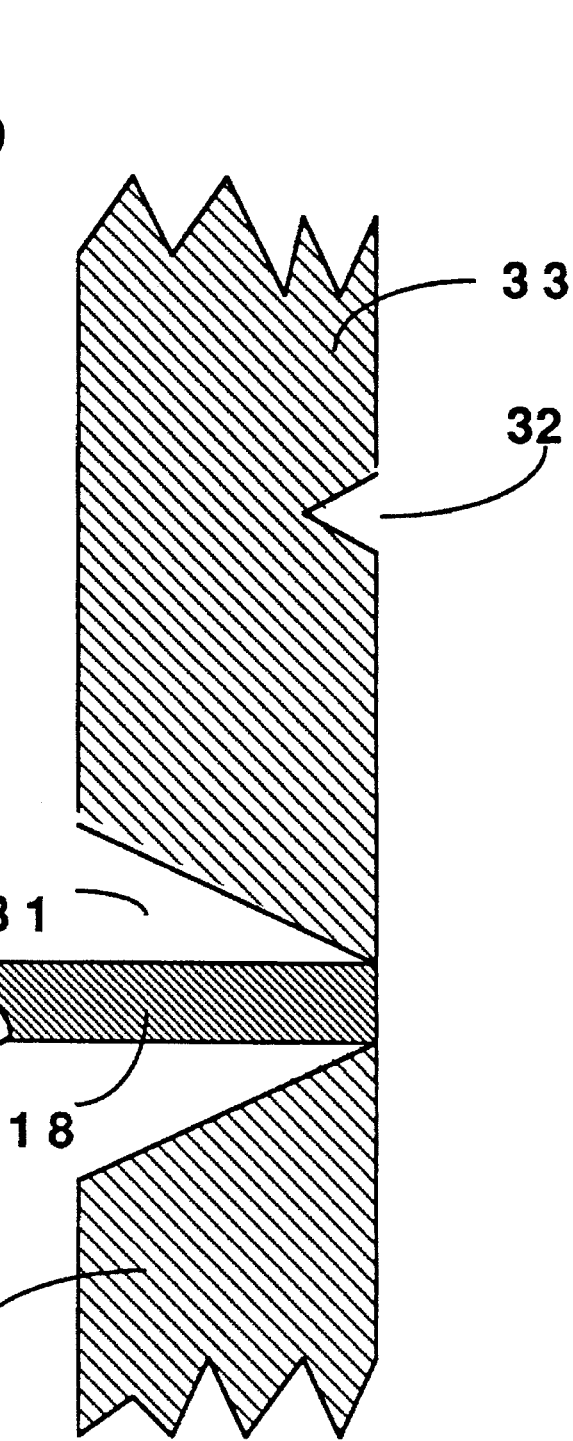

FACE-LOCK INTERCONNECTION MEANS FOR OPTICAL FIBERS AND OTHER OPTICAL COMPONENTS AND MANUFACTURING METHODS OF THE SAME

SPECIFICATION

This application is a continuation-in-part of Ser. No. 08/276,829 filed on Jul. 18, 1994, now abandoned.

BACKGROUND OF THE INVENTION

Optical fibers have been used widely for many applications, most notably for optical fiber communication. As the optical fiber communication is inching toward individual offices and residential area, the cost of optical interconnection become the major issue. The interconnection includes fiber-to-fiber connection, light source-to-fiber connection, fiber-to-detector connection. The interconnection costs are high due to the small size of the optical beams involved. A typical laser diode has a light-emitting spot in the order of one or two microns. Single-mode fiber, the most commonly used one, has about 9-micron core (and 125 micron cladding). When two single-mode fibers, or a single-mode fiber and a laser diode, are connected, the alignment should be within one or two micron in terms of the transverse offset.

As an example, in order to achieve such an alignment accuracy when connecting two optical fibers, each of the fibers is inserted in an elongated precision plug with nominally 125 micron inside diameter (ID). The two mating plugs are then inserted into an elongated precision sleeve. The required tight dimensional requirements of these elongated parts drive up the cost of the optical fiber connection.

SUMMARY OF THE PRESENT INVENTION

Accordingly, it is the primary objective of the present invention to devise an alternative approach for mating optical fibers, waveguide channels, light sources, detectors, lenses, etc.

It is the ultimate objective of the present invention to lower the costs of optical interconnections involving optical fibers, integrated optic waveguides, light sources, detectors, lenses, and other related optical components, so as to maximize the contribution of the fiber optics to the construction of information superhighway infrastructure.

In the present invention for connecting two optical components such as optical fibers, light sources, and detectors, a first optical component is positioned on a first surface with an unique surface feature, while a second optical component is positioned on a second surface a matching surface feature. The two surface features are designed to be locked in a stable mating position when brought together. The surface features preferably consist of fine features, with the dimensions of the height and the depth of the fine features comparable to the width of the finest detail of the surface features. If the surface feature comprises V-grooves or V-ridges, the depth or height of the V-grooves or V-ridges would be comparable to its width. This novel mating mechanism is named "Face-Lock" in this invention disclosure. While the plugs, pins, and sleeves of the conventional connectors rely mostly on the tight fit along the depth of the elongated cylindrical features of the plugs, sleeves, pins, and holes, the present invention mainly rely on the matching of surface features. While the ratio between the diameter and the length of the plugs, sleeves, pins, and holes are typically greater than 1-to-5, the comparable ratio between the width and the depth of a typical surface feature of the present invention is substantially less than that, a typical number being around 1-to-1.

The face-lock surface features may be registered on the mating surfaces by a conventional photolithographic procedure, which have sub-micron registration accuracy. Preferably, the positions of the optical components and the face-lock surface features are registered during one sequence of the photolithographic procedure so as assure a sub-micron accuracy in their relative locations. Such a registration would limit the depth and height of the features because the lithographic technique is basically surface technology. The surface features of the present invention will thus have only superficial depth. For large-core multimode fibers, plastic molding technique may be used for generating the face-lock surface features in order to lower the cost even further. Regardless of the fabrication methods, the face-lock surface features of the present invention would have only superficial depth, maintaining its two-dimensional nature. In contrast, all the conventional connecting elements such as plugs, sleeves, and pins possess three-dimensional bulk features with substantial depth below the mating surfaces.

Modular approach is possible in the present invention in which a combination of the face-lock embodiments are stacked together, one on top of the other, to align a number of optical components such as optical fibers, laser diodes, LED's (light-emitting diodes), detectors, etc.

Low-speed optical switching is possible if the face-lock surface feature has a periodic pattern with a certain interval, so that two optical elements can be mated in more than one positions.

BRIEF DESCRIPTION OF THE DRAWINGS

FIG. 11 shows the sectional view of FIG. 7 across X-X' in which the face-lock feature and the through-hole are fabricated by micromachining technique on a (100) silicon wafer.

FIG. 12 shows the same as in FIG. 11, except that the face-lock surface feature and, the through-hole are fabricated on the mutually opposite sides of the (100) silicon wafer.

FIG. 24 shows a set of three through-holes with slightly varying dimensions to choose from.

DETAILED DESCRIPTION

Figure 1:
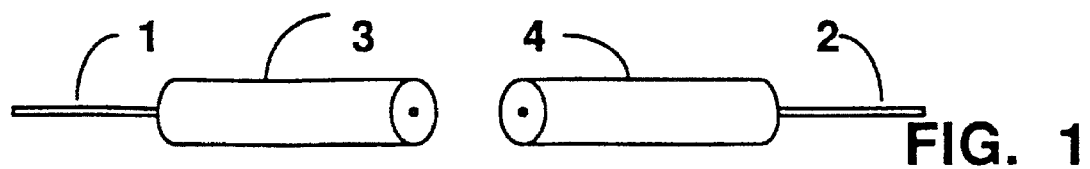
FIG. 1 shows schematically two optical fibers terminated inside conventional connector plugs.
Figure 2:
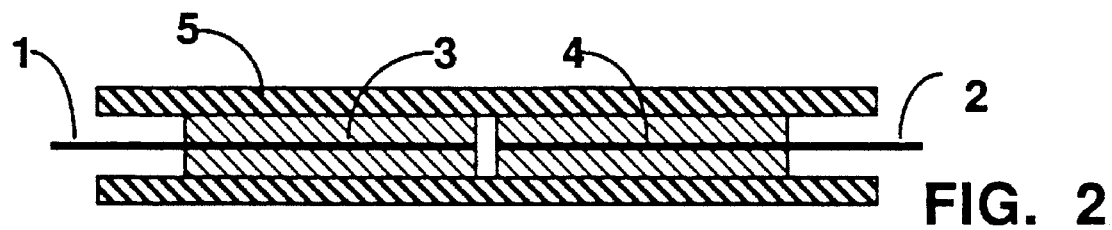
FIG. 2 shows a sectional side view of the fibers and the plugs of FIG. 1 aligned via a conventional alignment sleeve.

FIG. 1 shows in a highly schematic manner two optical fibers 1 and 2 inserted and terminated in conventional elongated connector plugs 3 and 4. The two plugs 3 and 4 are then inserted into an elongated sleeve 5. The most-commonly used fiber is 9-micron core single-mode fiber. The 9-micron cores should be aligned within one or two micron in order not to suffer from a substantial light loss. In order to satisfy such a tight alignment requirement, the dimensions of the plugs and the sleeve should be accurate within one micron or so.

Figure 3:
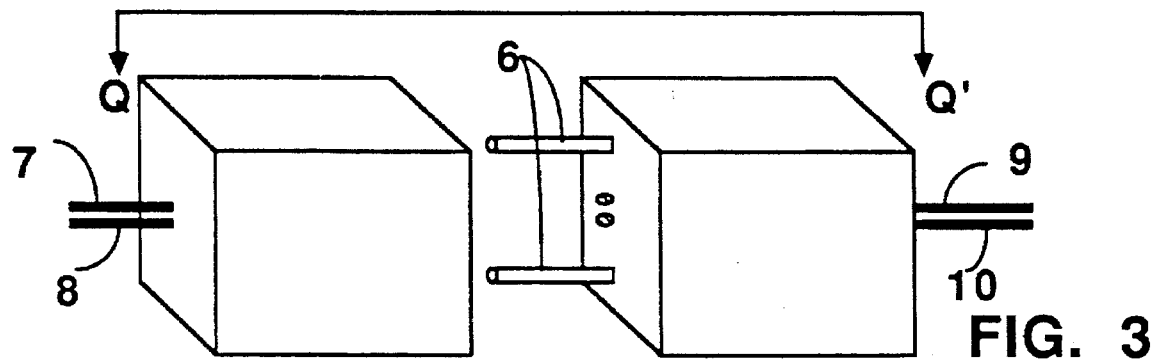
FIG. 3 shows schematically a conventional connector embodiment for aligning optical fibers, especially in an array form, using pins and holes.
Figure 4:
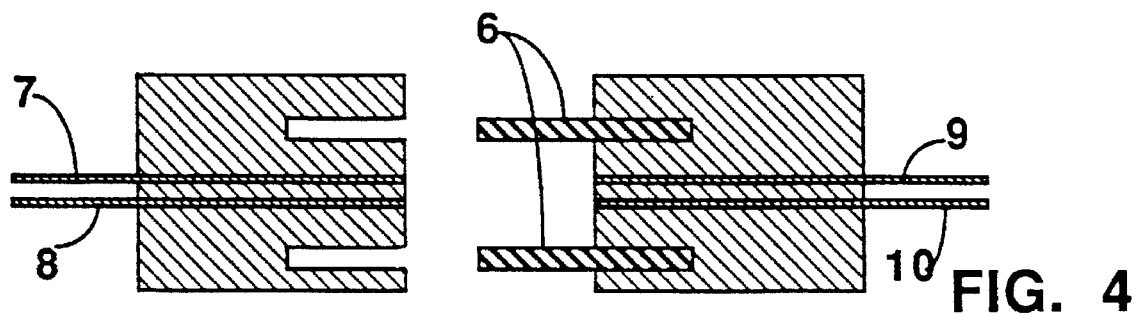
FIG. 4 shows a sectional side sectional view of the connector embodiment of FIG. 3.
Figure 5:
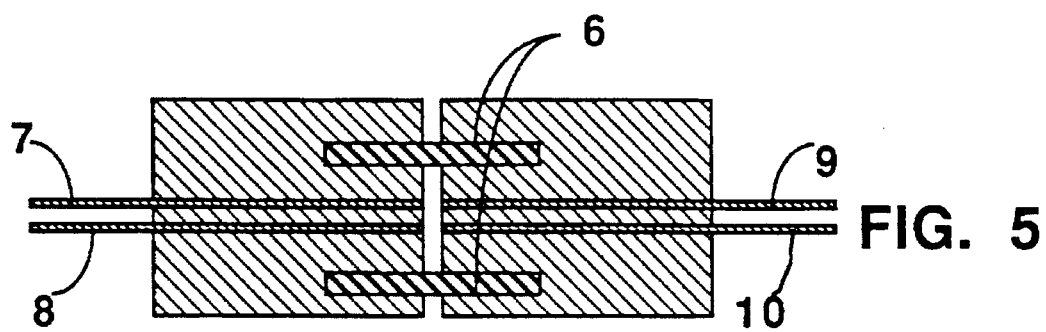
FIG. 5 shows the same as shown in FIG. 4 after the parts are mated.

Another conventional way of mating fibers, especially fibers in an array form, involves a set of elongated alignment pins 6 such as sketched in FIG. 3, in which fibers 7, 8 are aligned with 9 and 10, respectively, through the elongated pins 6. FIG. 4 shows the sectional side view along Q-Q'. FIG. 5 shows the same after the connection is completed. An example of this prior art can be found in U.S. Pat. No. 4,341,439 (Malcom H. Hodge).

In these examples, we notice that the most critical element in aligning two optical fibers is positioning the end of the fibers precisely on the mating plane. Thus, the problem is two-dimensional in its nature. However, the conventional optical connectors achieve optical alignment via elongated cylindrical elements such as plugs, sleeves, pins, and holes, thus converting the optical interconnection problem from the two-dimensional nature to three-dimensional one. This is the origin of the difficulty experienced in the conventional interconnection approaches. In particular, the conventional interconnection approaches cannot benefit from the modern photolithographic technique that has submicron registration accuracy because the photolithography is largely a surface technology while the conventional connection means are three-dimensional in its nature.

Figure 6:
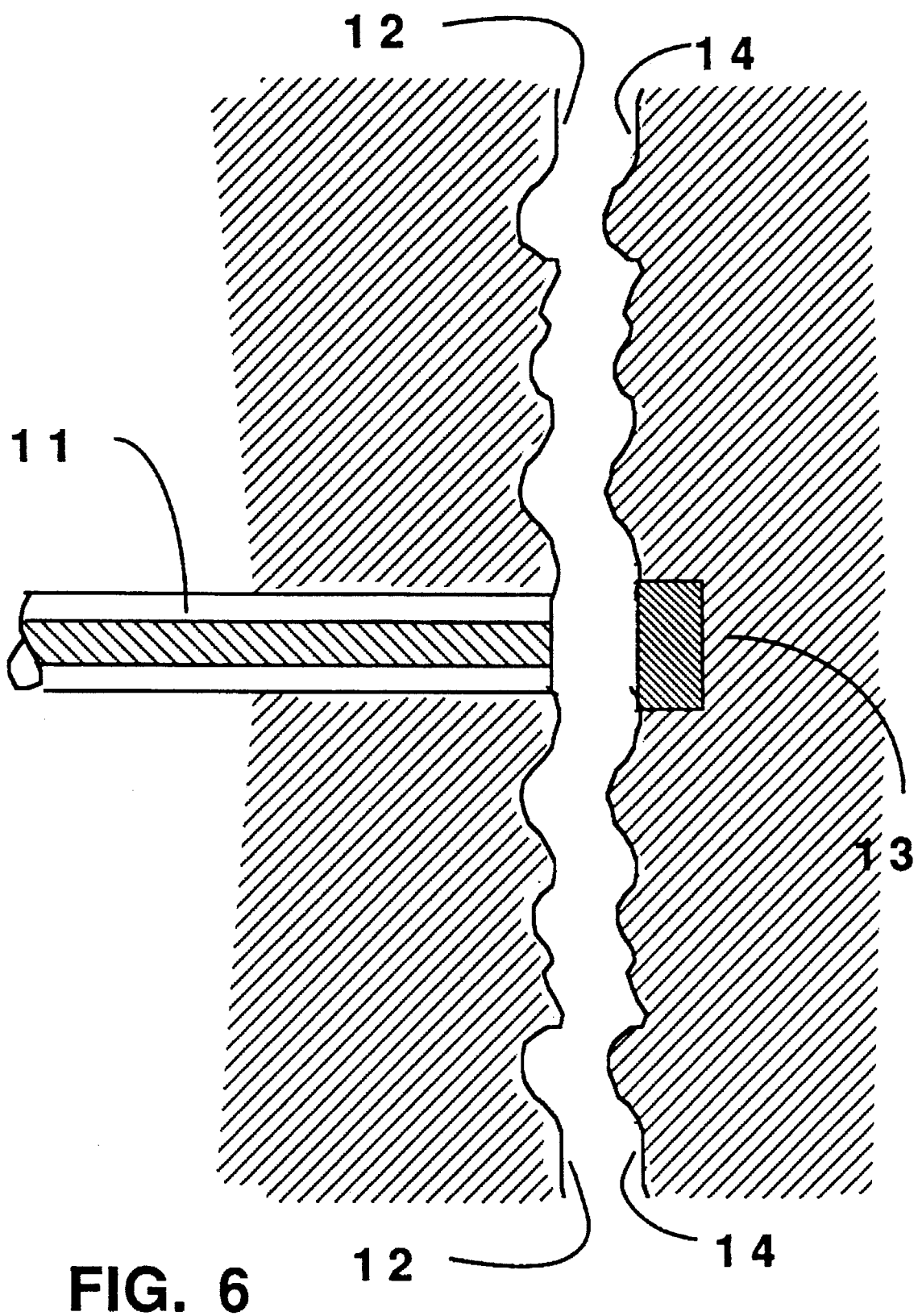
FIG. 6 illustrates the face-lock mechanism of the present invention.

In the present invention, an optical alignment remains largely as a two-dimensional surface problem. More specifically, the alignment in the present invention mainly relies on the surface features residing in the optical interface plane. FIG. 6 shows an example of the present invention. It comprises four elements: an optical fiber as a first optical component 11, a first surface 12; a detector as a second optical component 13, and a second surface 14. The first surface 12 has an unique contour or feature on it, while the second surface 14 has another unique feature that matches with the feature of the first surface 12. The two surfaces 12 and 14 thus lock in a stable position when brought together. As pointed out above, the face-lock features in the present invention are largely two-dimensional surface features. Accordingly, the depths and the heights of the features are superficial, typically in an order of the width of the smallest surface feature.

Figure 7:
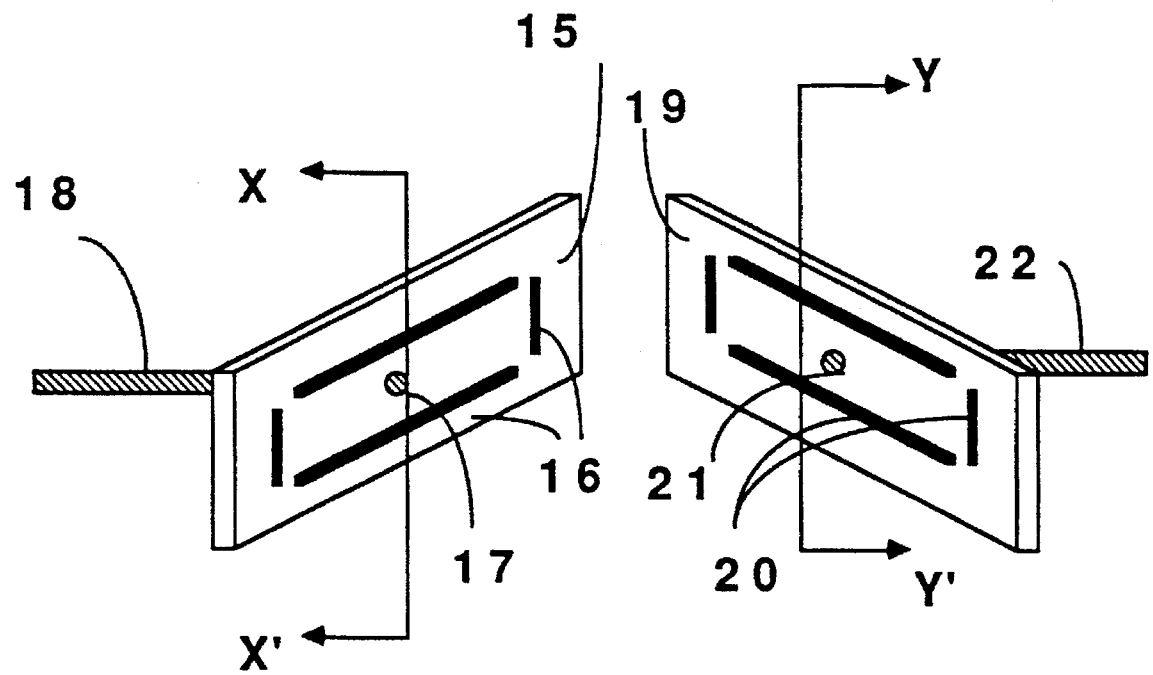
FIG. 7 shows an example of the present invention, featuring a slab with a face-lock surface feature and a through-hole to accommodate an optical fiber.
Figure 8:
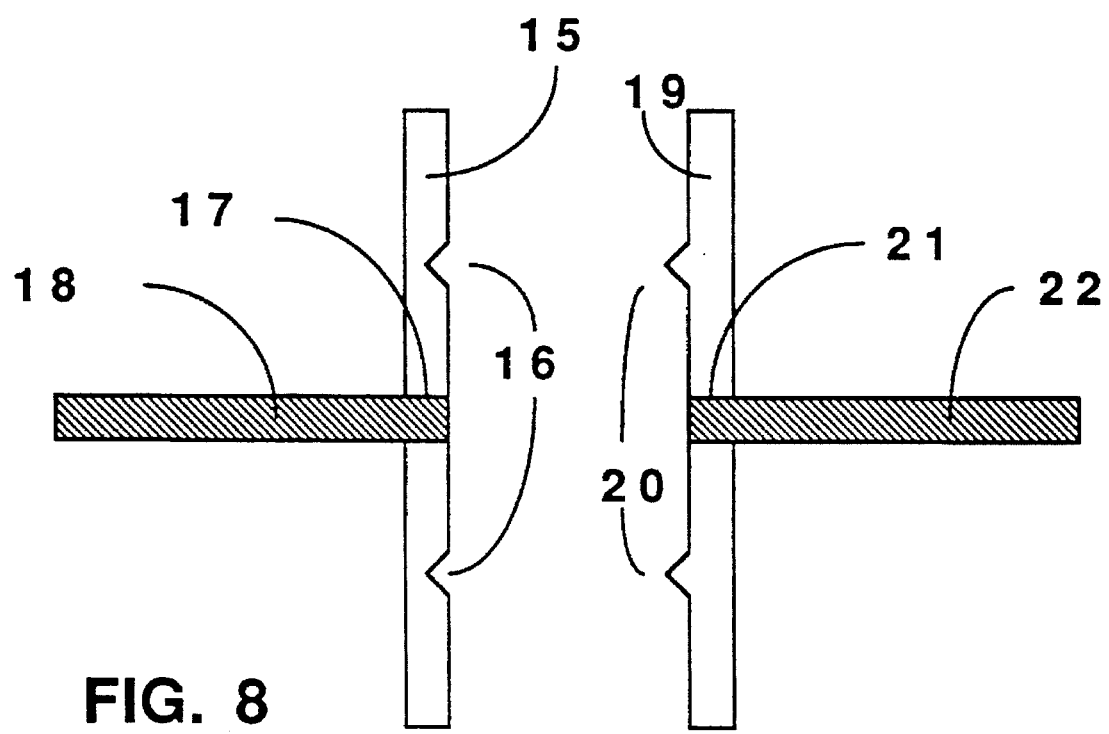
FIG. 8 shows the sectional view across X-X' and Y-Y' in FIG. 7.
Figure 9:
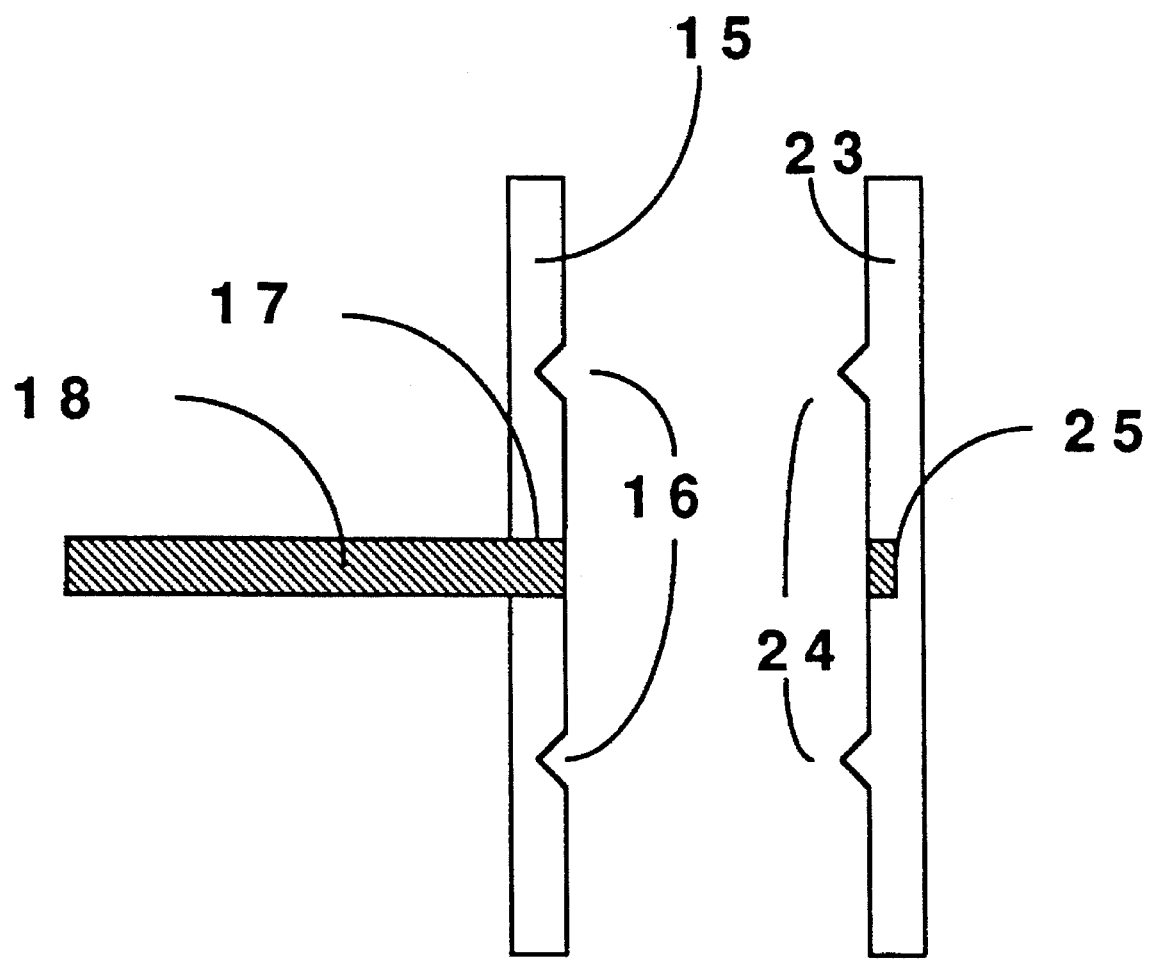
FIG. 9 shows the same as in FIG. 8 except that the second optical fiber is replaced by a photodetector.

An embodiment that contains the four essential elements illustrated in FIG. 6 is shown in FIG. 7, in which the first slab 15 has a face-lock surface feature 16, and a through-hole 17 through which the first optical fiber 18 is terminated on the surface of the slab 15; and the second slab 19 has a matched face-lock surface feature 20, and a through-hole 21 through which the second optical fiber 22 is terminated on the surface of the slab 19. FIG. 8 show the sectional views across X-X' and Y-Y', respectively, of the two slabs 15 and 19, respectively, of FIG. 7. The shapes of the recessed grooves 16 and the protruded ridges 20 may be different from shown without the altering the basic teaching of the present invention. Also, the optical fibers 18 and 22 may be replaced any other optical components such as surface emitting laser diodes, LED's, or photodetectors without altering the essence of the teaching of the present invention. FIG. 9 shows the same as in FIG. 7, except that the second fiber 22 is replaced by a photodetector 25.

It should be understood that the slabs 15 and 19 in FIG. 7 do not have to be thin as shown. The slabs 15 and 19 can be very thick without altering the essence of the teaching of the present invention. When the slabs 15 and 19 are thin as shown, bulk materials may be attached to the rear side of the slabs 15 and 19 so as to stabilize the orientation of the optical fibers 18 and 22. The bulk materials may have holes to house the fibers 18 and 22, but the holes do not have to be tight and precise in the diameter and location since the alignment is made on the face-lock surface features 16 and 20 on the mating plane.

In FIG. 7 or 8, the grooves 16 and the ridges 20 should be aligned with a great precision so that they are locked with a desired precision, which is better than one or two microns. This can be achieved by the well-established photolithographic procedure incorporated with thin-film techniques such as film deposition and etching processes. Such a technique is known as "micromachining". Micromachining is usually done on a semiconductor substrate, such as silicon (Si), gallium arsenide (GaAs), indium phosphite (InP). Most of light sources and detectors are also fabricated on such semiconductor substrates. Accordingly, it is most convenient to fabricate the face-lock surface features while fabricating the optical components. This example is shown in FIG. 9, where the optical fiber 22 of FIG. 8 is replaced by a photodetector 25 fabricated on a Si or InP substrate 23.

When an optical fiber 18 is involved, it is necessary to fabricate the through-hole 17 or 20. In general, such a precision hole may be fabricated by the photolithographic technique so long as the depth of the hole is not too much greater than the hole diameter. A process such as chemical etching or ion-milling may be utilized. The embodiments of the precision holes and their manufacturing methods will be described here for the sake of the present invention, but will not be claimed in the present invention. They will be claimed in a divisional patent application titled "Micromachined holes for optical fiber connection" because they constitute a different invention.

Figure 10:
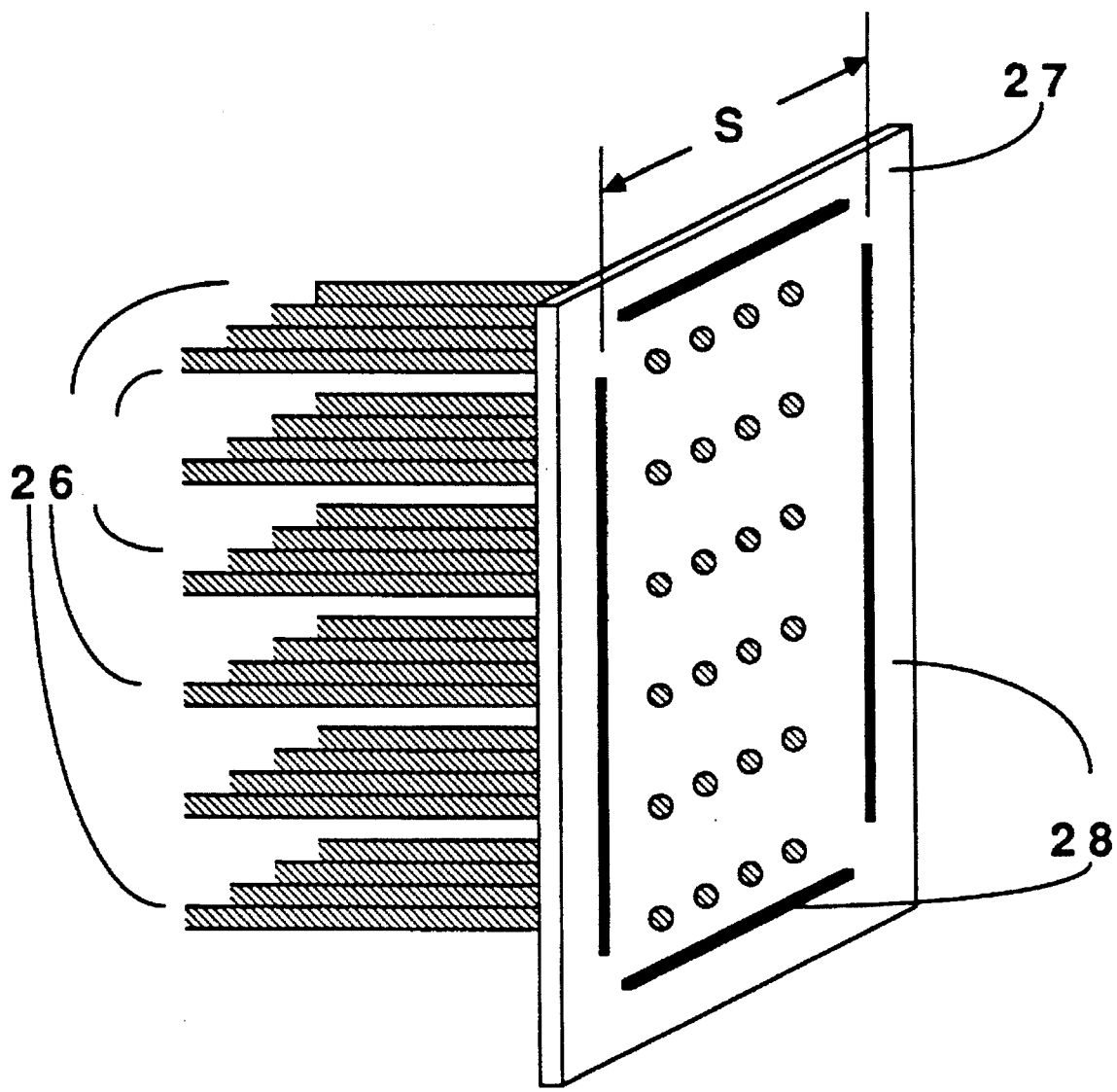
FIG. 10 shows the same as in FIG. 7, except that there are many through-holes to accommodate an array of optical fibers.

As a straightforward extension of the embodiment of FIG. 7, an array embodiment is shown in FIG. 10, in which an array of optical fibers 26 is terminated on a slab 27. This array capability is another powerful advantage of the present invention compared to the conventional approaches because, when the photolithographic technique is used to make the face-locking surface features and the through-holes, it is as easy to make many elements as it is to make just one.

One manufacturing method, the so-called micromachining, will be described in detail as it is a preferred manufacturing method. The fabrication is based on the well-known preferential etching of a semiconductor substrate. For example, on a (100) silicon or gallium Arsenide wafer, v-grooves can be micromachined in which the side walls have a definite angle with respect to the surface regardless of the groove size. In other words, the angle is unique to a wafer being used. Utilizing the technique, a V-groove 29 and through-holes 30 as shown in FIG. 11 can be fabricated on the surfaces of (100) silicon wafer 15. Since the wall slope angle is universal, the minimum clearance of the through-hole 30 can be fabricated predictably. FIG. 12 is the same as shown in FIG. 11, except that the through-hole 31 and the face-lock surface feature 32 are fabricated on the opposite sides of the wafer 33. This makes the fabrication more complex, but such a level of complexity is routinely achieved in the general micromachining technology field. The fiber 18 can be inserted from the rear side much more easily in the case of FIG. 12 compared to that of FIG. 11.

Figure 13:
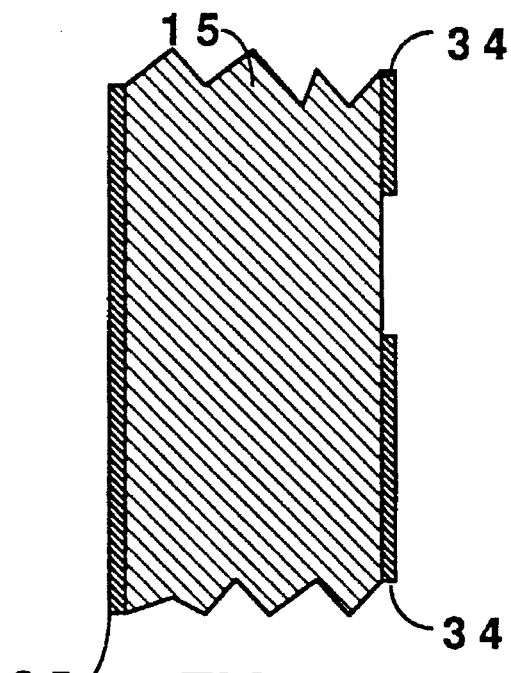
FIG. 13 shows the first micromachining step, in which a pattern of thin-film layer is created on each side of a silicon wafer.
Figure 14:
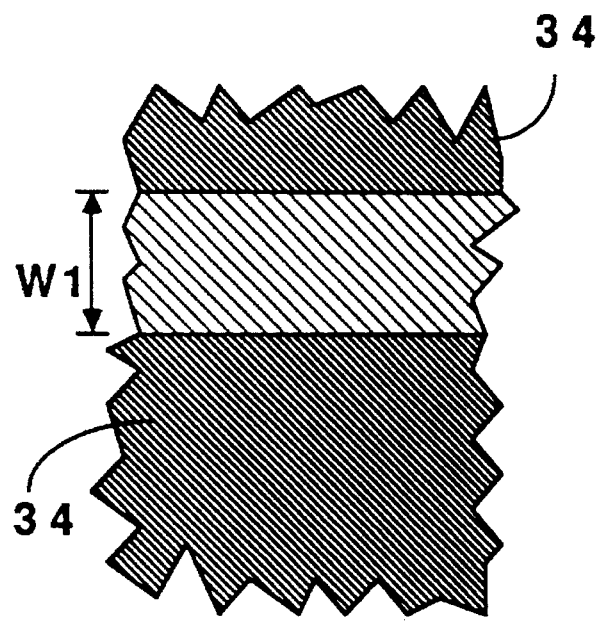
FIG. 14 shows the face view of the embodiment shown in FIG. 12.
Figure 15:
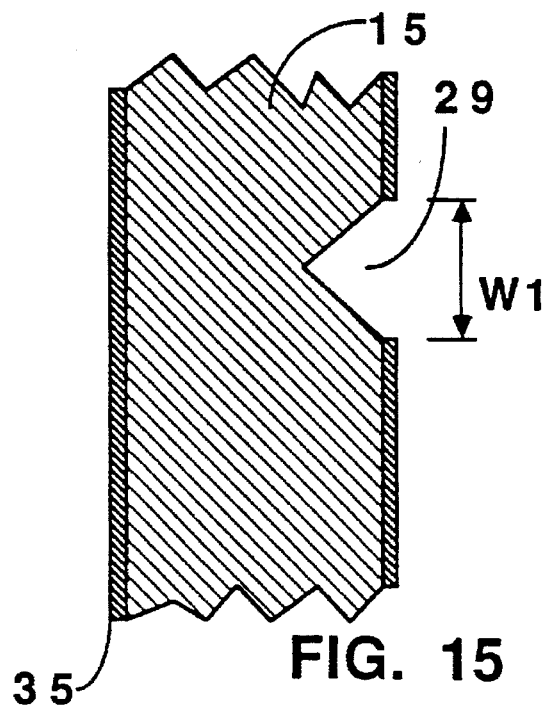
FIG. 15 shows the etching step, in which an alignment V-groove is etched through the opening of the thin-film layer of FIG. 13 or 14.
Figure 16:
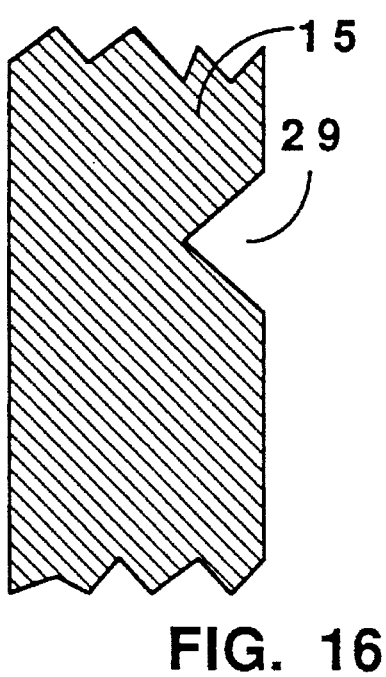
FIG. 16 shows the same as shown in FIG. 15, except that the masking layer is stripped off.

The detailed processing steps for making the face-lock groove 29 of FIG. 11 are as follows: as schematically illustrated in FIG. 13, a mask layer 34 is patterned on the front side and another layer 35 is uniformly deposited on the rear side (this second mask is to prevent etching of the back side) on the silicon wafer with (100) crystal orientation. The photolithography technique can achieve a submicron resolution in positioning a desired pattern on a predetermined position. The frontal face view of FIG. 13 is sketched in FIG. 14. Then the wafer 15 is immersed in an etchant such as KOH, which etches the wafer in the (100) direction much faster than in (111) direction (by a factor as high as 500 to 1,000). Thus the etchant etches the silicon material mostly into the (100) direction, that is, in the direction perpendicular to the wafer surface. The sidewalls inside the v-groove 29 of FIG. 15 are the hard-to-etch facets, namely the (111) facets. Accordingly, the depth of the V-groove depends on the opening W1 of the mask layer 34. The mask layers 34 and 35 may be stripped off when the etching is completed, or may be left intact as its thickness is typically less than one micron.

Figure 17:
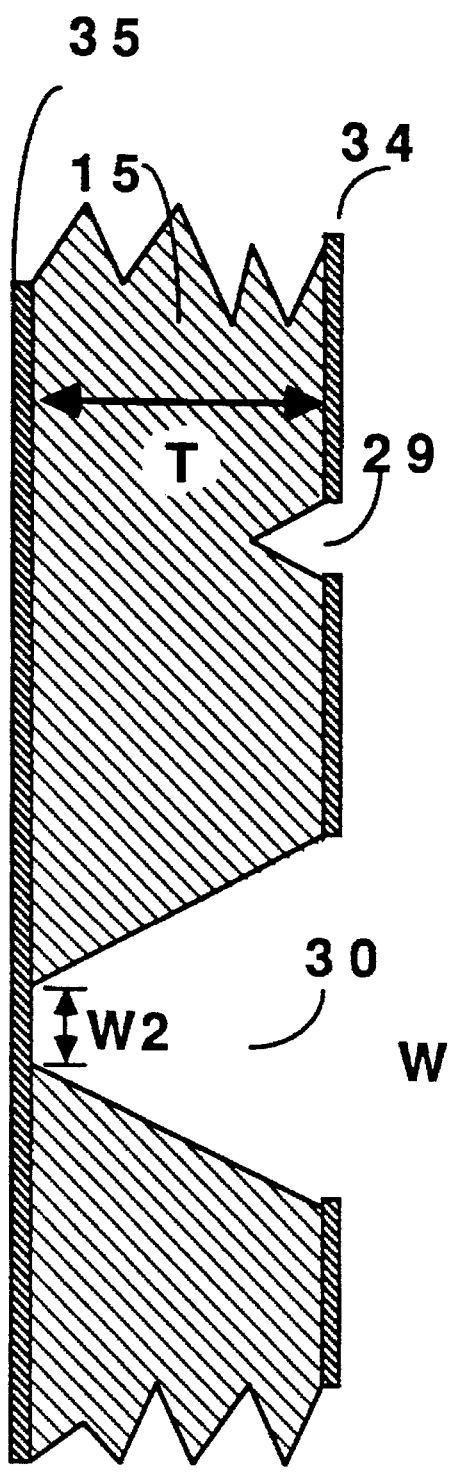
FIG. 17 indicates that the same process shown in FIGS. 13 through 16 can be used to make a through-hole as well as the alignment groove.
Figure 18:
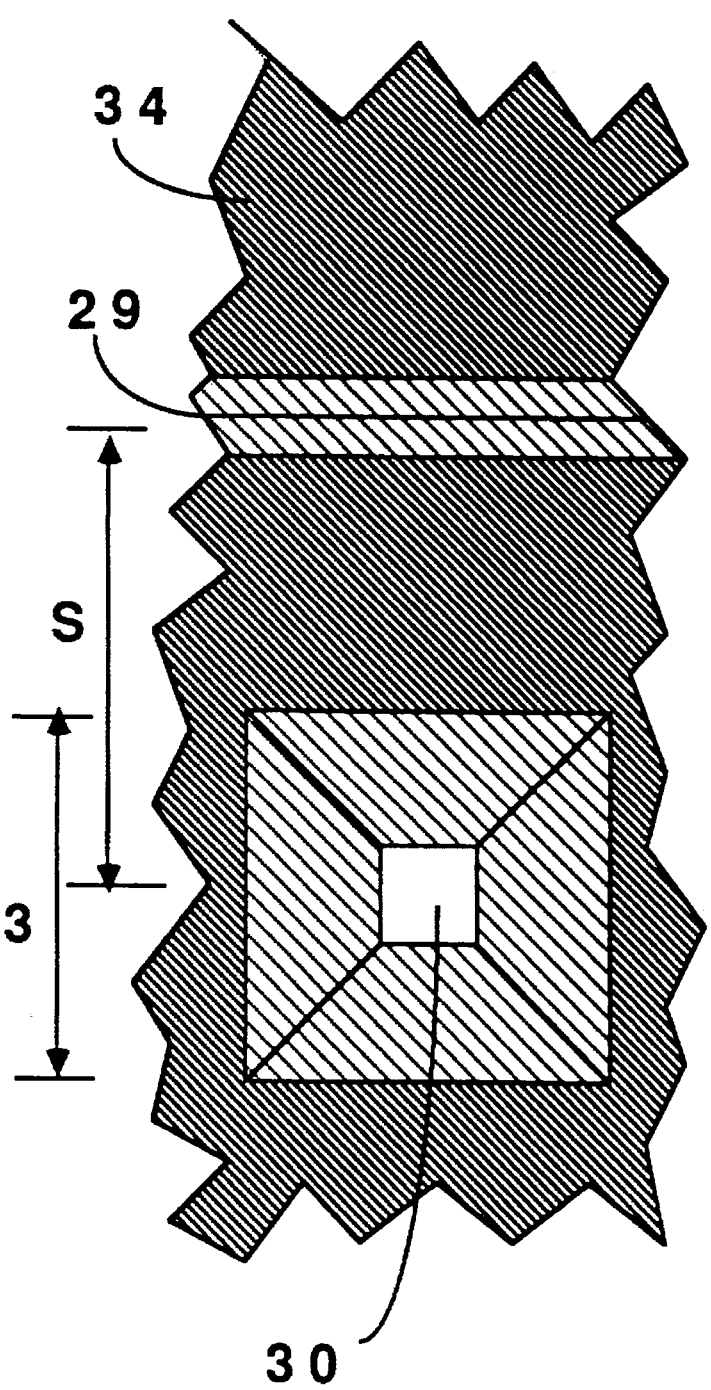
FIG. 18 shows the face view of the embodiment shown in FIG. 17.

The through-hole 30 of FIG. 11 may be fabricated by essentially the same procedure. As shown in FIG. 17 and FIG. 18, which is its frontal face view, the opening of the mask layer 34 is a square with side-length W3. W3 is large enough to punch through the wafer 15 when the wafer is etched, producing a through-hole 30 as desired (see FIG. 11). Again, the angle of the side walls is a constant number as it is defined by the (111) facets of the silicon. Accordingly, if the size of the hole W2 and the wafer thickness T are known, the value for the mask opening W3 can be calculated. The distance S between the center-line of V-groove 29 and the center-line of the thorough-hole 30 may be replicated with better than 0.5 micron accuracy. In other words, even though the widths of the grooves 29 and 30 may vary one or two microns through the etching, the center-lines of the grooves (the lines defining the bottom of the grooves) do not change because they are registered by the photolithography mask, and any over-etching or under-etching of the grooves and squares are done symmetrically with respect to the center-lines. This characteristic invariance of the center-lines is one of the striking features of the present invention.

Figure 19:
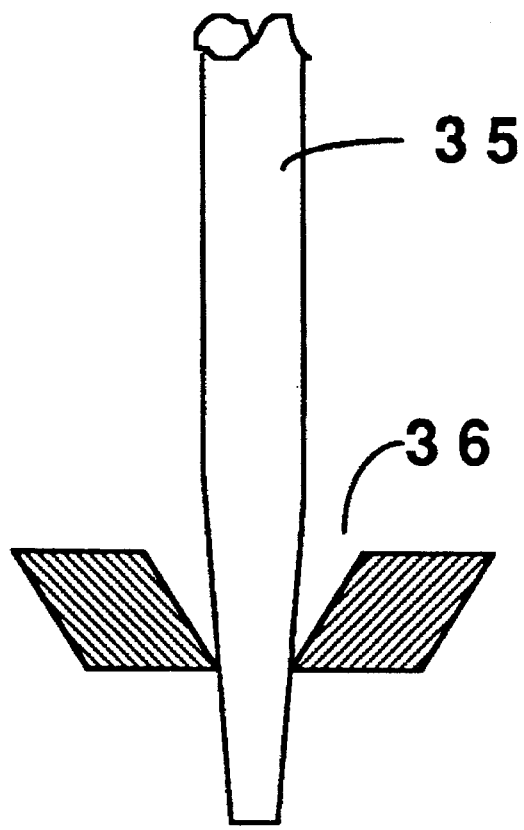
FIG. 19 shows that a tapered optical fiber will fit tightly in the through-hole, easing the tolerance of the hole size.
Figure 20:
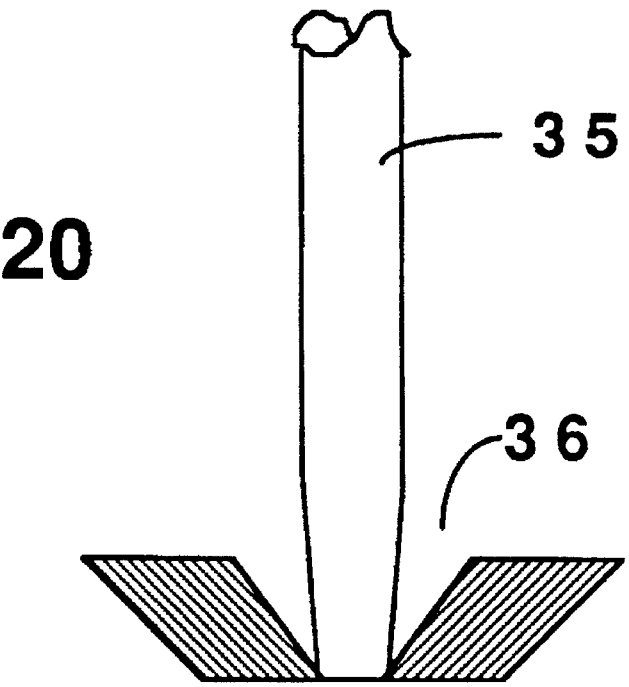
FIG. 20 shows the same as shown in FIG. 19, except that the fiber is terminated by cutting and polishing.

This characteristic invariance of the center-lines may be further enhanced if the optical fiber 35 is tapered in the diameter as shown in FIG. 19. Breaking off the excess length and polishing the end facet of the fiber 35, as illustrated in FIG. 20, will result in the perfect fit of the fiber inside the through-hole 36, keeping the center of the fiber 35 perfectly on the designed position.

Figure 21:
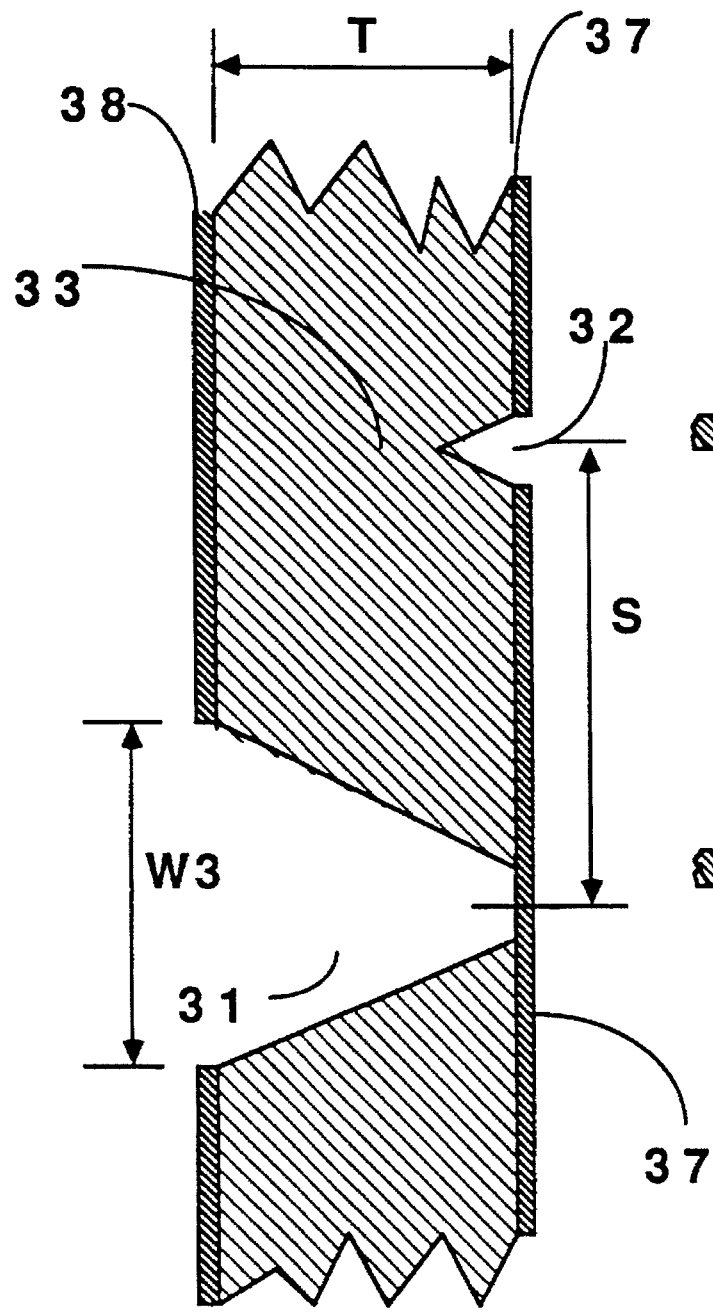
FIG. 21 is the same as shown in FIG. 17, except that the through-hole is etched from the rear side so as to realize the embodiment shown in FIG. 12.
Figure 22:
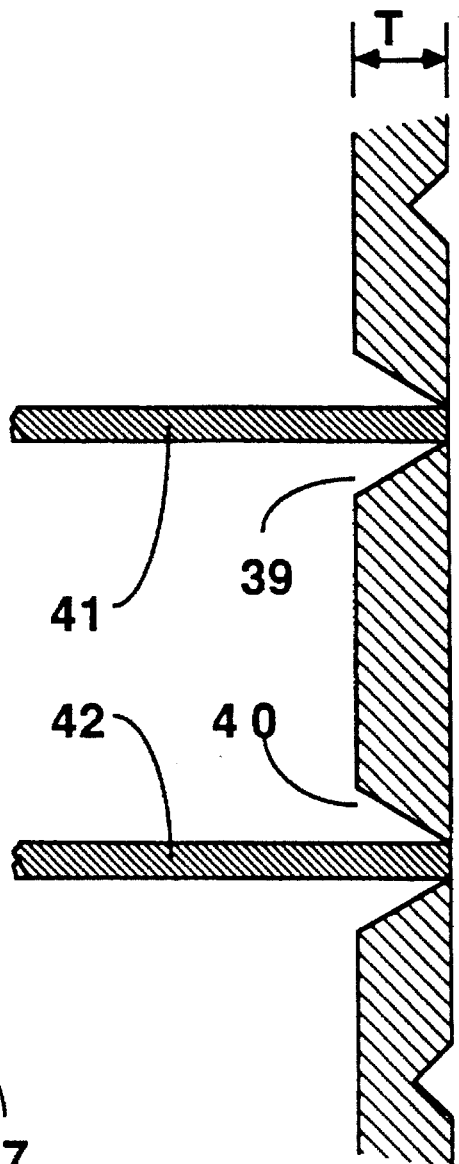
FIG. 22 shows the same as shown in FIG. 12, except that more than one through-holes are fabricated to accommodate many fibers.

Since the optical fiber 18 is entering from the rear side of the through-hole, it would be convenient to have the through-hole tapered out toward the left side of the wafer, as shown in FIG. 12. This can be realized by patterning the mask layers 37 and 38 as shown in FIG. 21, in which etching is done on the both sides of the wafer 33. The center-to-center distance S can be precisely registered, as an example, by using a mask-aligner with a infrared light camera, which allows viewing simultaneously the both sides of the wafer. When the mask layer 37 is not removed, it works as a window on the through-hole, and the end facet of the optical fibers 18 in FIG. 12 may be glued to the window. FIG. 22 shows a straightforward extension to an array form, in which two through-holes 39 and 40 for two optical fibers 41 and 42 can be produced using a different photolithographic masks but by the same fabrication method.

Figure 23:
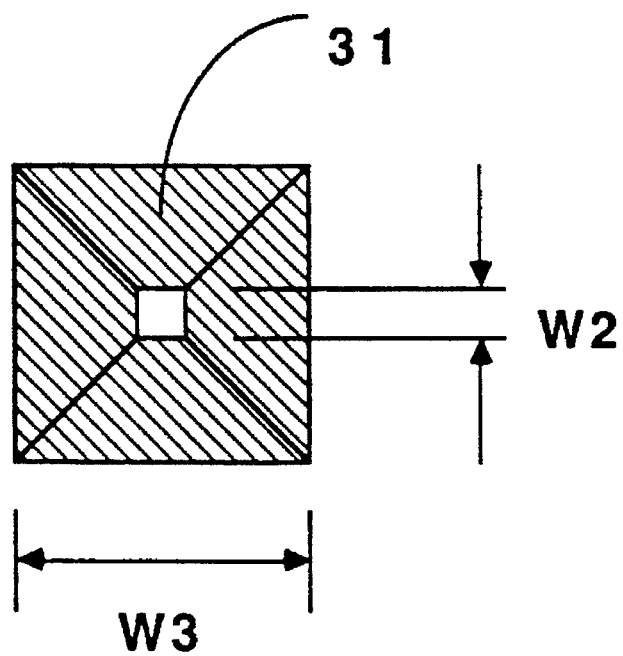
FIG. 23 repeats the view of the through-hole of FIG. 18.
Figure 24:
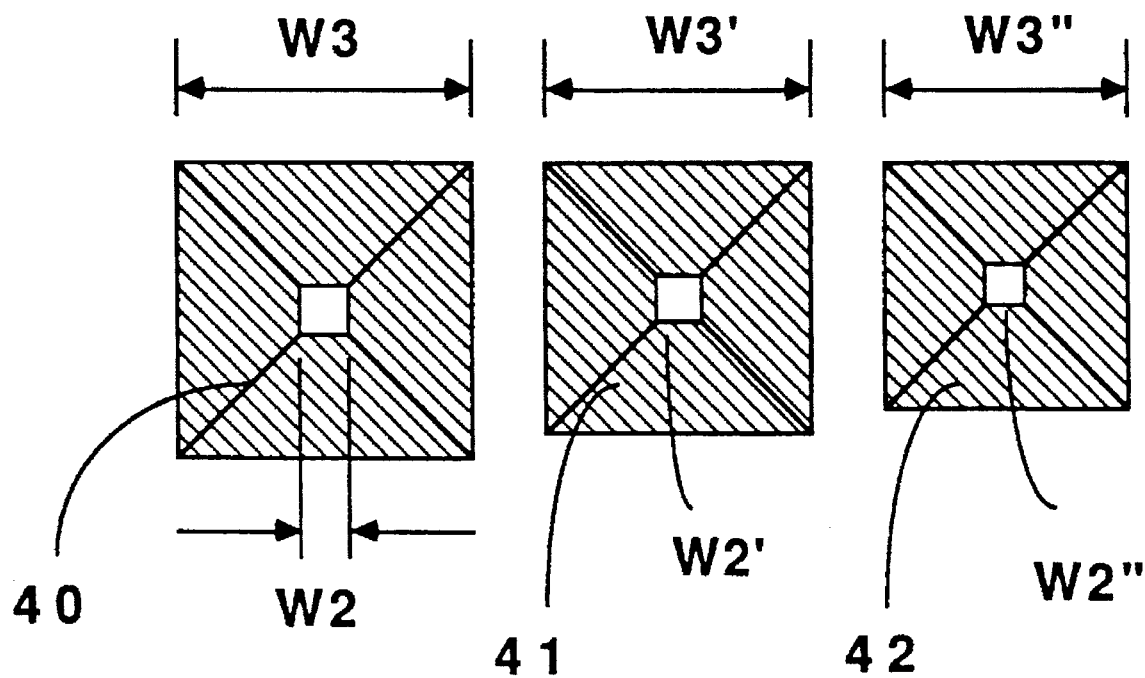
Figure 25:
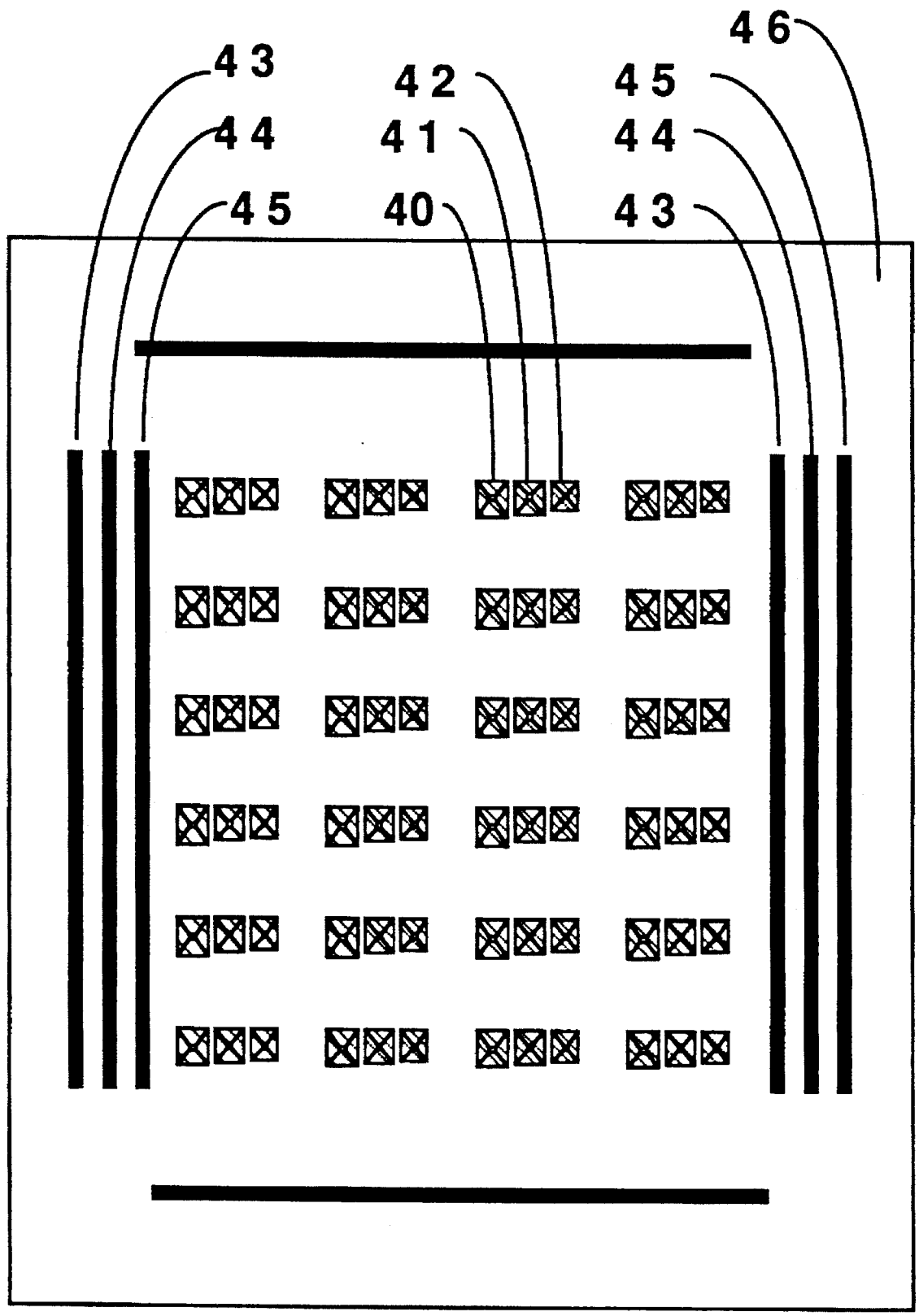
FIG. 25 shows the same as shown in FIG. 10, except that each through-hole is replaced by the set of three of FIG. 24, and each of the side grooves is replaced by three alignment grooves corresponding to the three through-holes.

When the through-hole 30 or 31 in FIG. 11 or 12 are fabricated, the hole clearance W2 should be very close to the diameter of the optical fiber in order to achieve a precision alignment. The through-hole 31 of FIG. 12 is shown separately in FIG. 23. For a given value W3, the value for W2 could vary slightly due to the variation of the thickness T of wafer 33 and undercut of the mask layer edges by the etchant. For example, the hole clearance W2 could turn out to be anywhere between 124 and 130 microns while the optical fiber diameter itself can vary between 123 to 127 microns. In the worst case the hole size W2 could be larger than an optical fiber by seven microns, or could be smaller than the fiber diameter. In order to accommodate this variations in the hole size and the fiber diameter, a number of through-holes with varying dimensions can be fabricated, as depicted in FIG. 24, which shows three through-hole sizes 40, 41, and 42. The pattern sizes on the photolithography mask are W3, W3', and W3". These will result in the corresponding sizes of the through-holes: W2, W2' and W2" (as examples, these three values could be 127, 125 and 123 microns, respectively). One of these three through-holes would match to a given optical fiber better than the other holes. The number of holes may be more than three. The resulting embodiment is shown in FIG. 25, which is a variation of the surface layout of FIG. 10: each of the through-holes in FIG. 10 is replaced by three through-holes in FIG. 25. There are also three sets of the face-lock grooves 43, 44 and 45 on the substrate 46.

Figure 42:
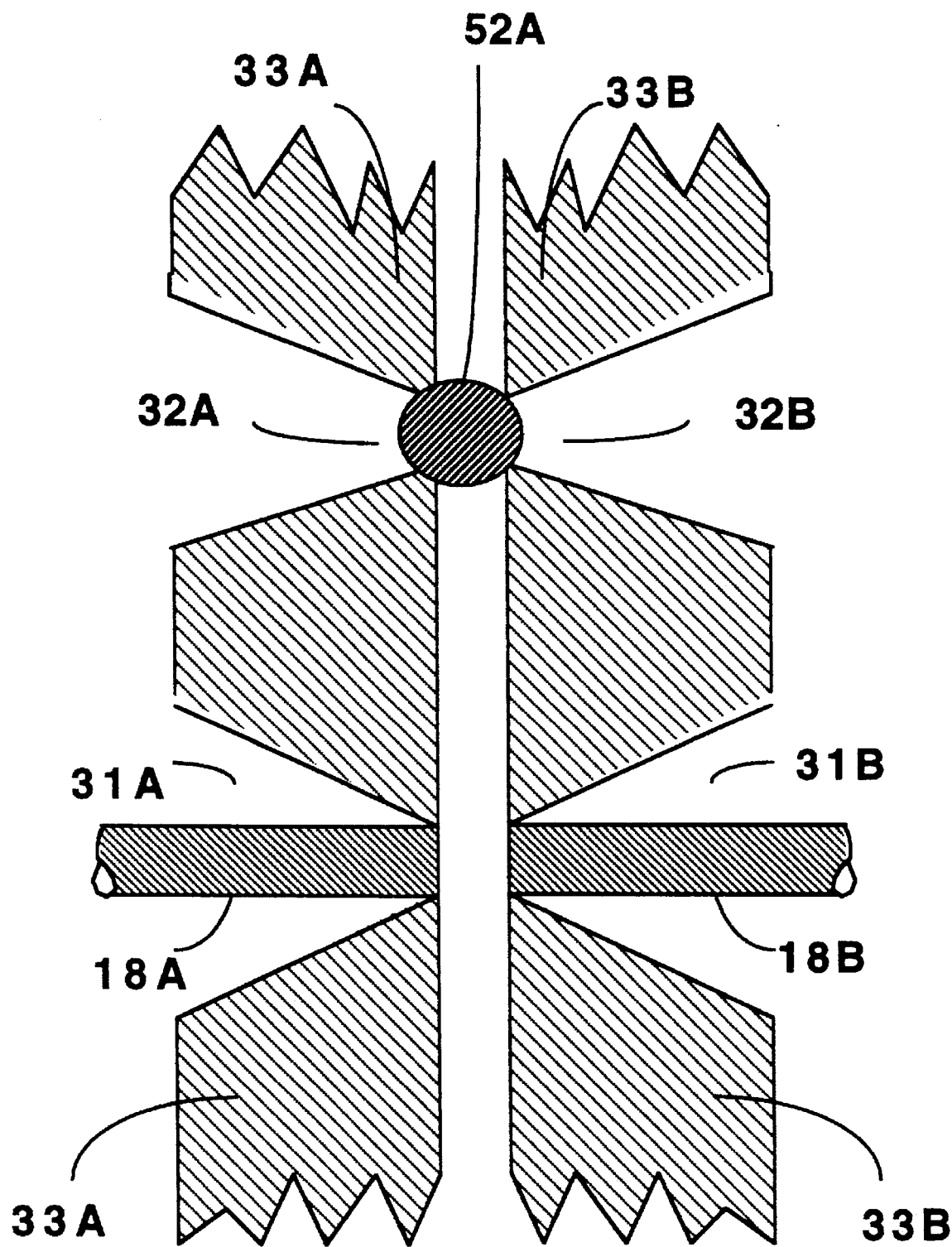
FIG. 42 shows an optical fiber and an integrated optic channel waveguide to be mated to each other.

As an useful comment, the micromachined grooves 28 in FIG. 10 or 43–45 in FIG. 42 have been actually used for optical fiber interconnections but in a very different way. Maekawa and et.al. (U.S. Pat. No. 5,315,678) and Murphy (U.S. Pat. No. 4,725,114) teach an embodiment in which optical fibers are laid down inside and along elongated micromachined V-grooves. In other words, the fibers and the elongated grooves are in the same plane. In the present invention, the fibers are laid perpendicular to the elongated V-grooves. Another difference is that they do not teach to use a micromachined through-holes to position the end of a fiber.

Figure 26:
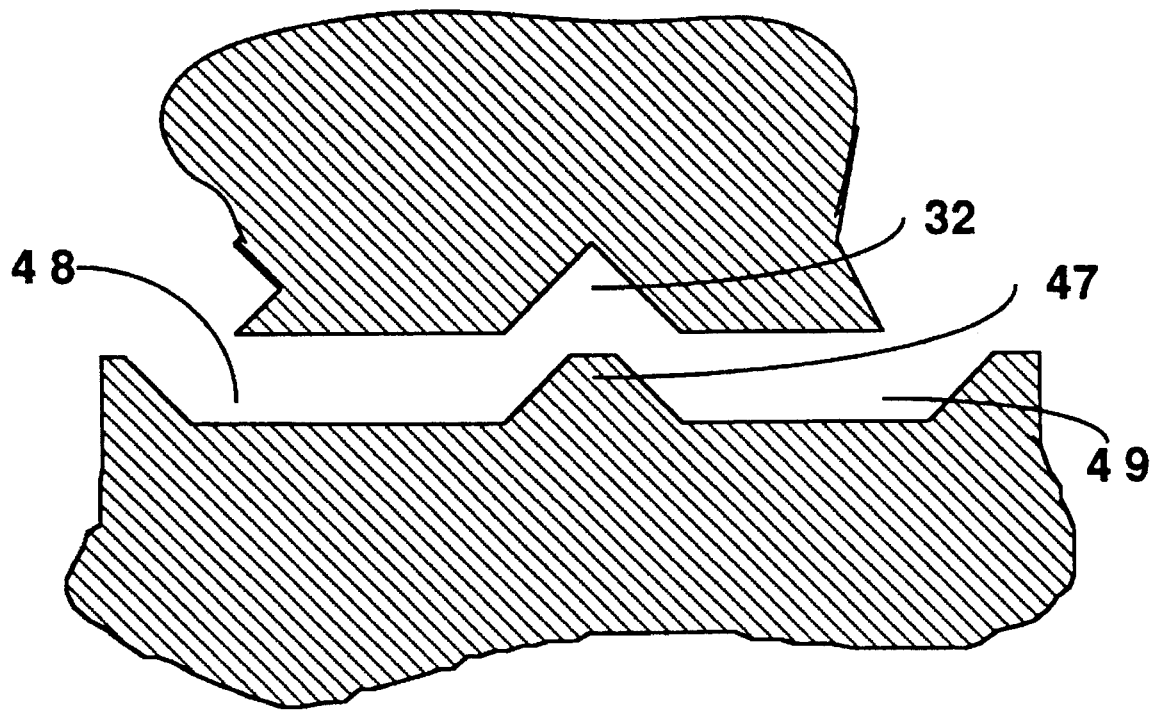
FIG. 26 shows a matched pair of a recessed alignment groove and a protruded alignment ridge.
Figure 27:
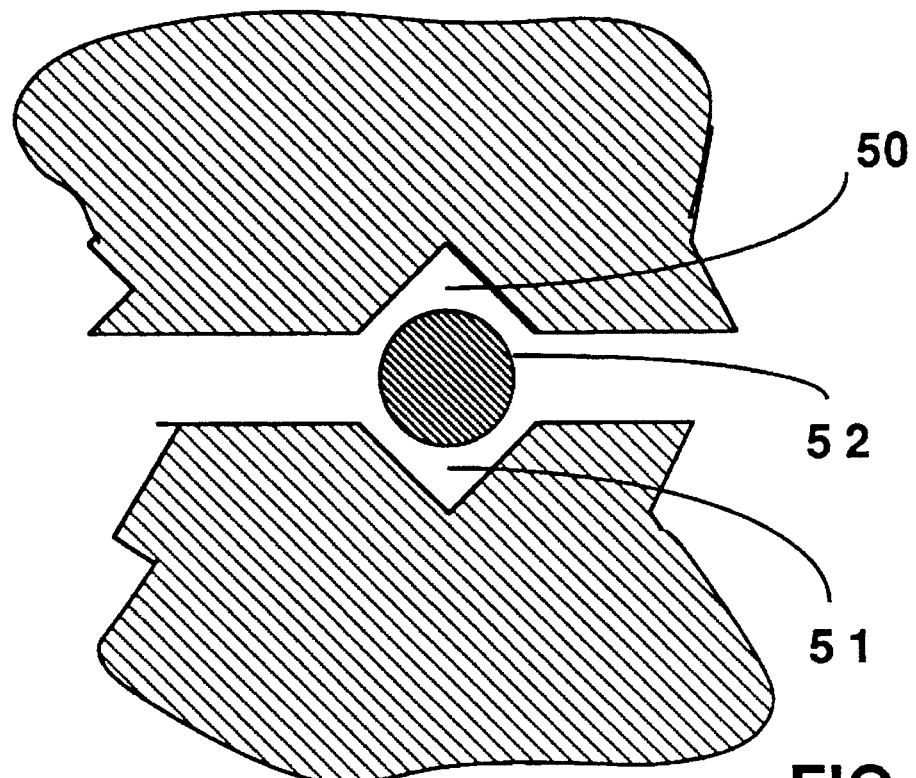
FIG. 27 shows two recessed alignment grooves and a cylindrical face-lock insert for aiding the surface-locking.
Figure 28:
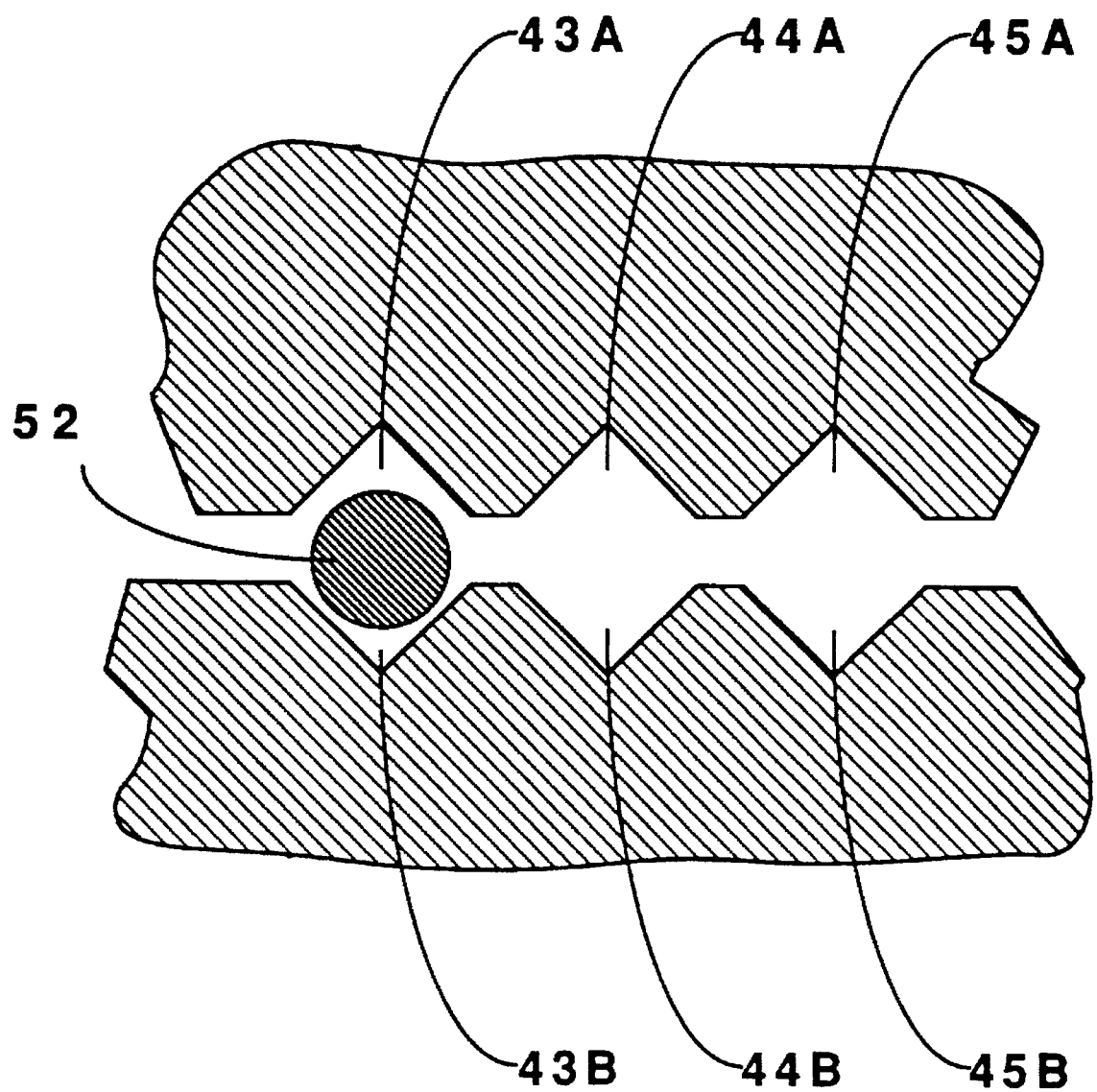
FIG. 28 shows the sectional view of a set of the three alignment grooves of FIG. 25.
Figure 29:
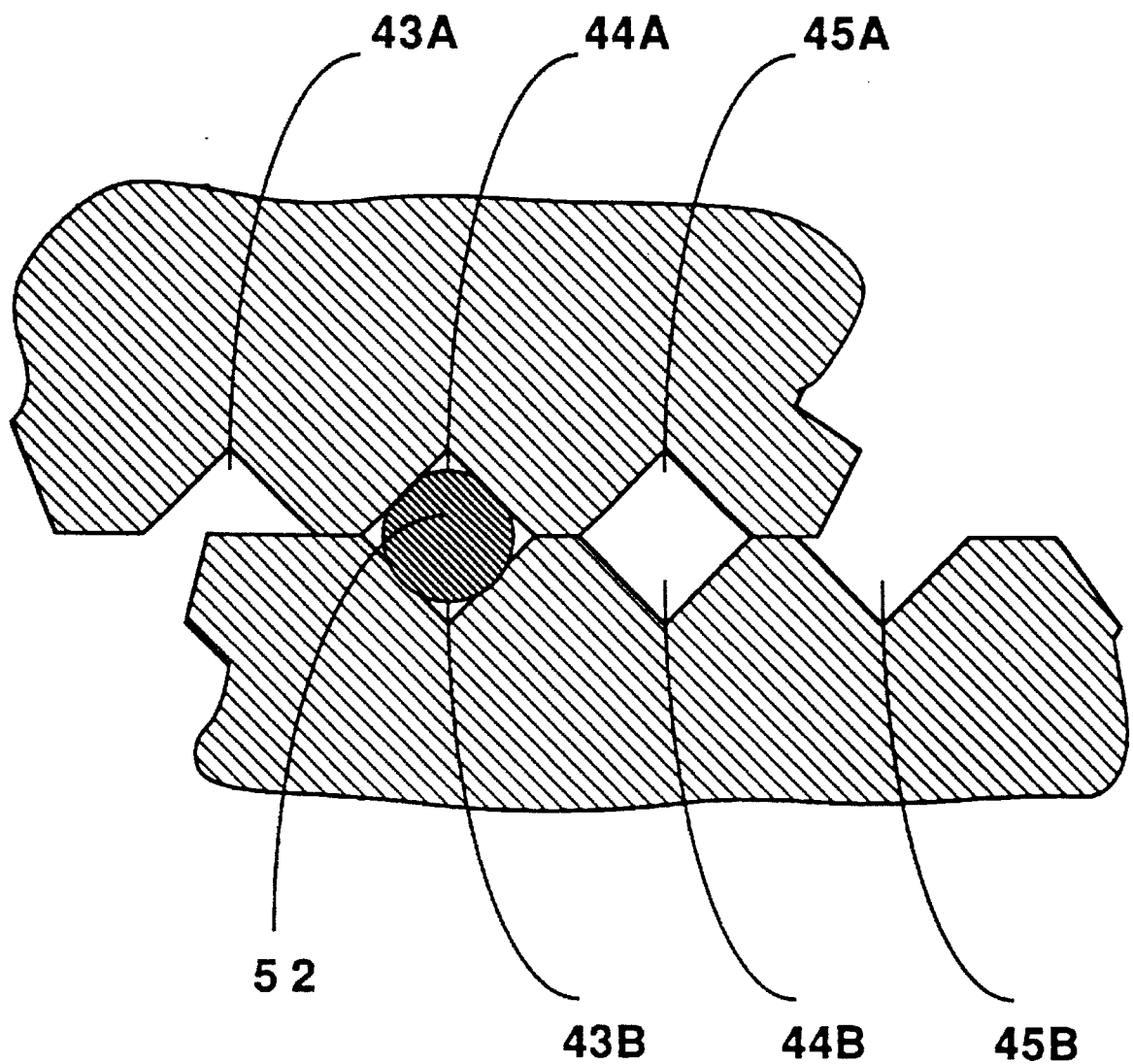
FIG. 29 shows that the same as shown in FIG. 28, except that the alignment was shifted by one notch.

When the connector part shown in FIG. 25 is mated with its matched connector part, one face-lock feature can be a recessed groove 32 while the other is a protruded ridge 47, as illustrated in FIG. 26. The ridge can be fabricated by etching two grooves 48 and 49 on the left and right sides of the ridge 47, respectively, in FIG. 26. Such a ridge is featured in FIG. 8. Alternatively, the face-lock features can be all recessed grooves 50 and 51, with an lock-insert 52 in a form of an elongated cylinder, as shown in FIG. 27. In the either case, the selection of one through-hole out of the three possibilities (40, 41, and 42 in FIG. 25) can be achieved by selecting the corresponding V-groove among the three possible sets, namely 43, 44, or 45. The resulting alignments are shown in FIGS. 28 and 29 as two possible examples.

Figure 30:
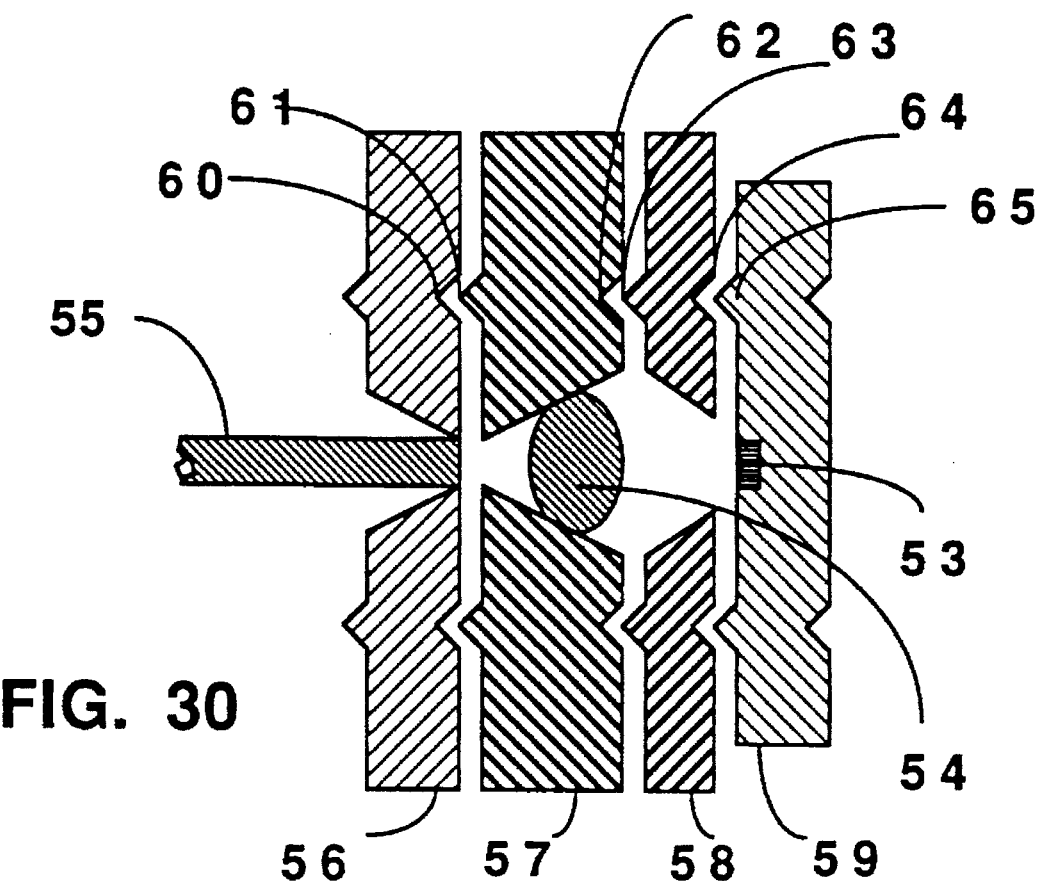
FIG. 30 shows that four pieces of face-lock embodiments are stacked together for optical alignments between a light source, a lens, and an optical fiber.
Figure 31:
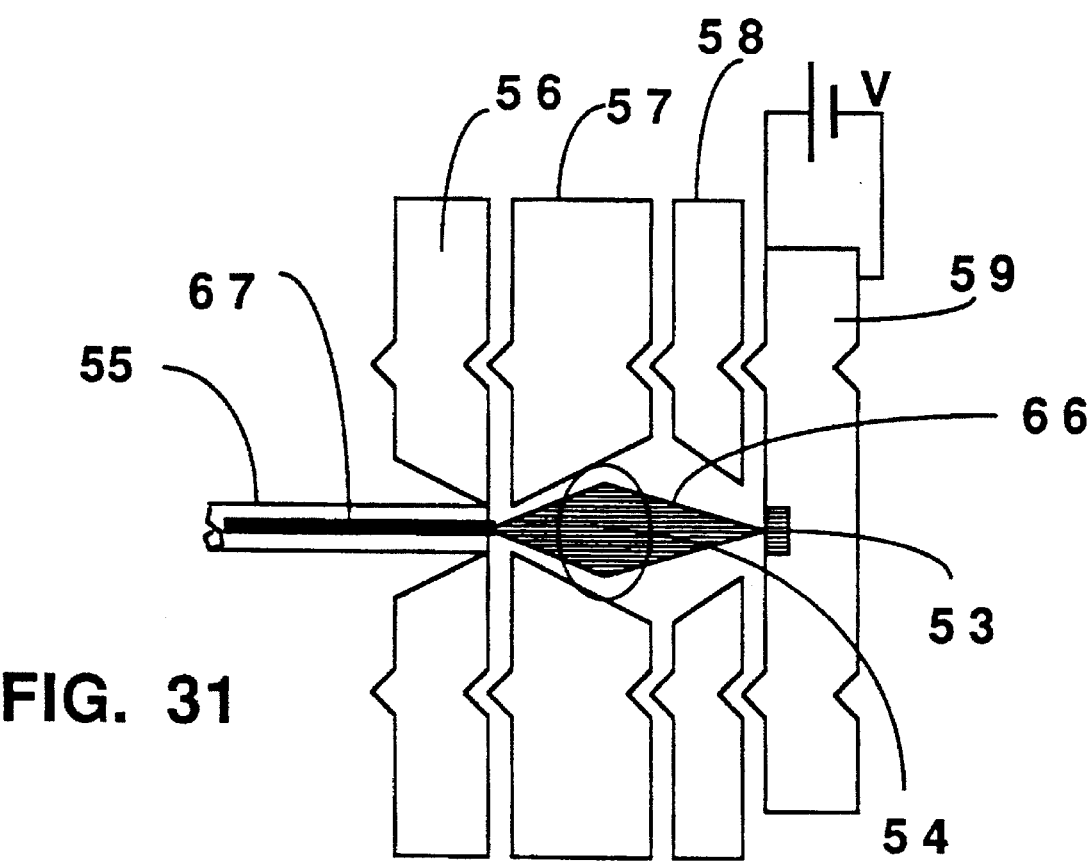
FIG. 31 shows the optical path of light from the light source to the fiber in FIG. 30.

FIG. 30 illustrates a number of embodiments of the present invention. As shown, optical components such as a light source 53, a lens 54, and an optical fiber 55 can be aligned through the face-lock features and through-holes as described above associated with FIG. 7 through FIG. 22. It represents a modular approach, in which a number of face-lock embodiments 56, 57, 58, and 59 are prepared separately and then assembled together using the self-alignment mechanism of the face-lock surface features 60 through 65. Photolithography ensures that the optical axis is at the center with sub-micron accuracy. The pre-determined thickness of the individual face-lock embodiments 57 and 58 ensures that the distances between the optical components, 53, 54, and 55, are accurate. FIG. 31 shows the path of light from the light source 53 through a focusing lens 54 and to the fiber core 67. The light source 53 may be a light emitting diode (LED) or surface emitting laser diode (that are energized by a voltage V shown in FIG. 31), or a light delivered from other place to the spot 53 by a reflector or/and a deflector.

Figure 32:
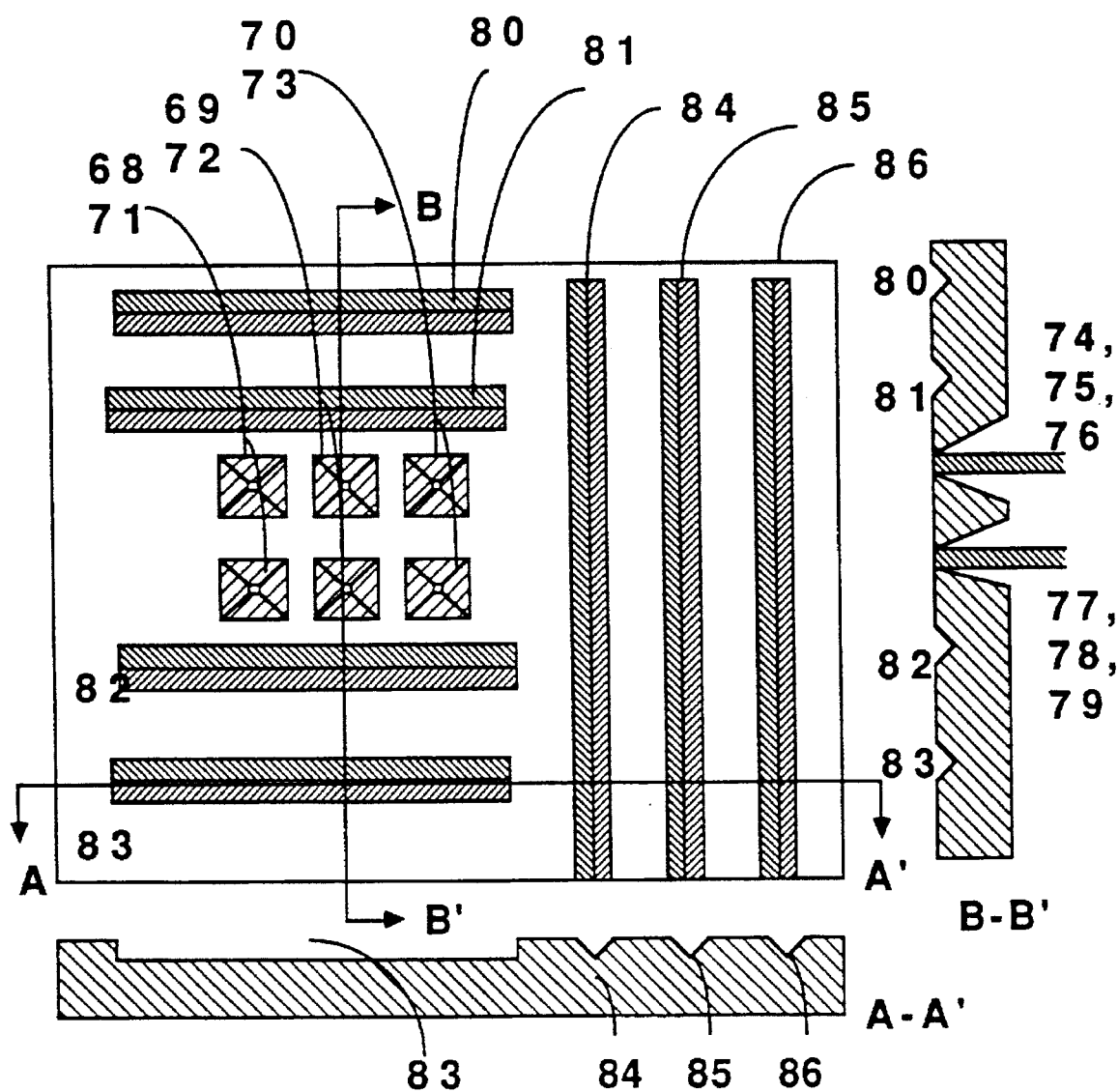
FIG. 32 shows a plan view, a side sectional view, and a front sectional view, of a connector embodiment comprising a number of through-holes and V-grooves in a periodic pattern.
Figure 34:
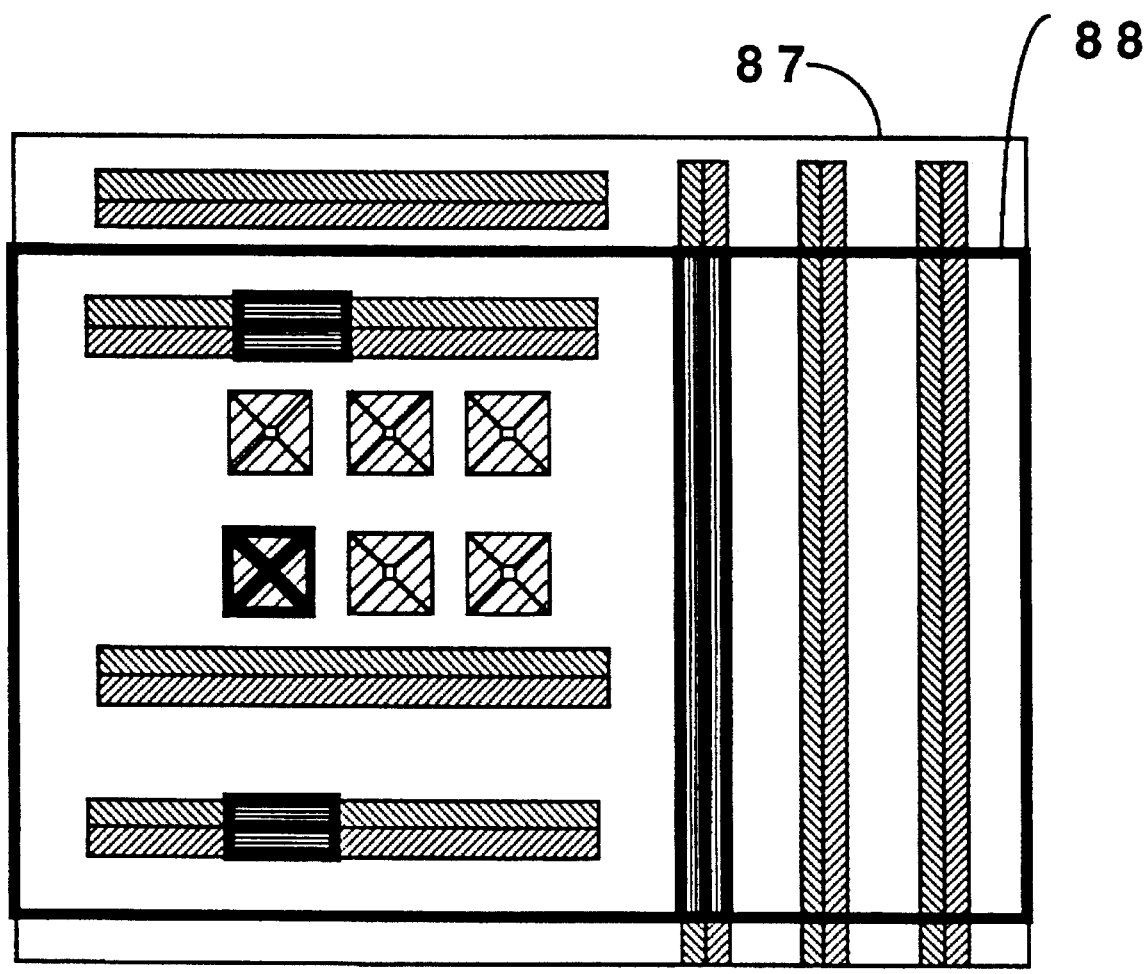
FIG. 34 illustrates that the two face-lock connector embodiments shown in FIG. 32 and FIG. 33 are face-locked in such a position as to align the lower left through-hole of FIG. 32.
Figure 35:
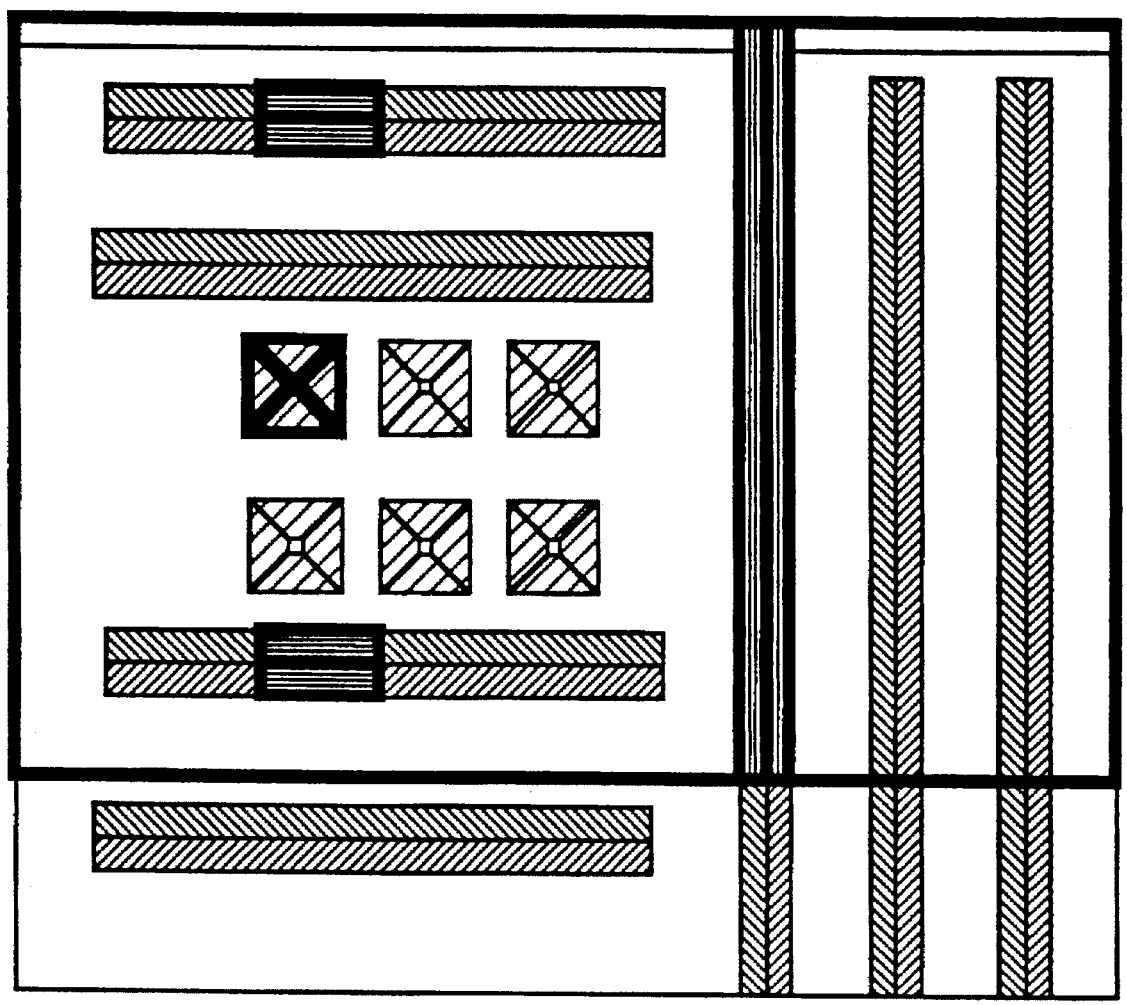
FIG. 35 illustrates that the two face-lock connector embodiments shown in FIG. 32 and FIG. 33 are face-locked in such a position as to align the upper left through-hole of FIG. 32.
Figure 36:
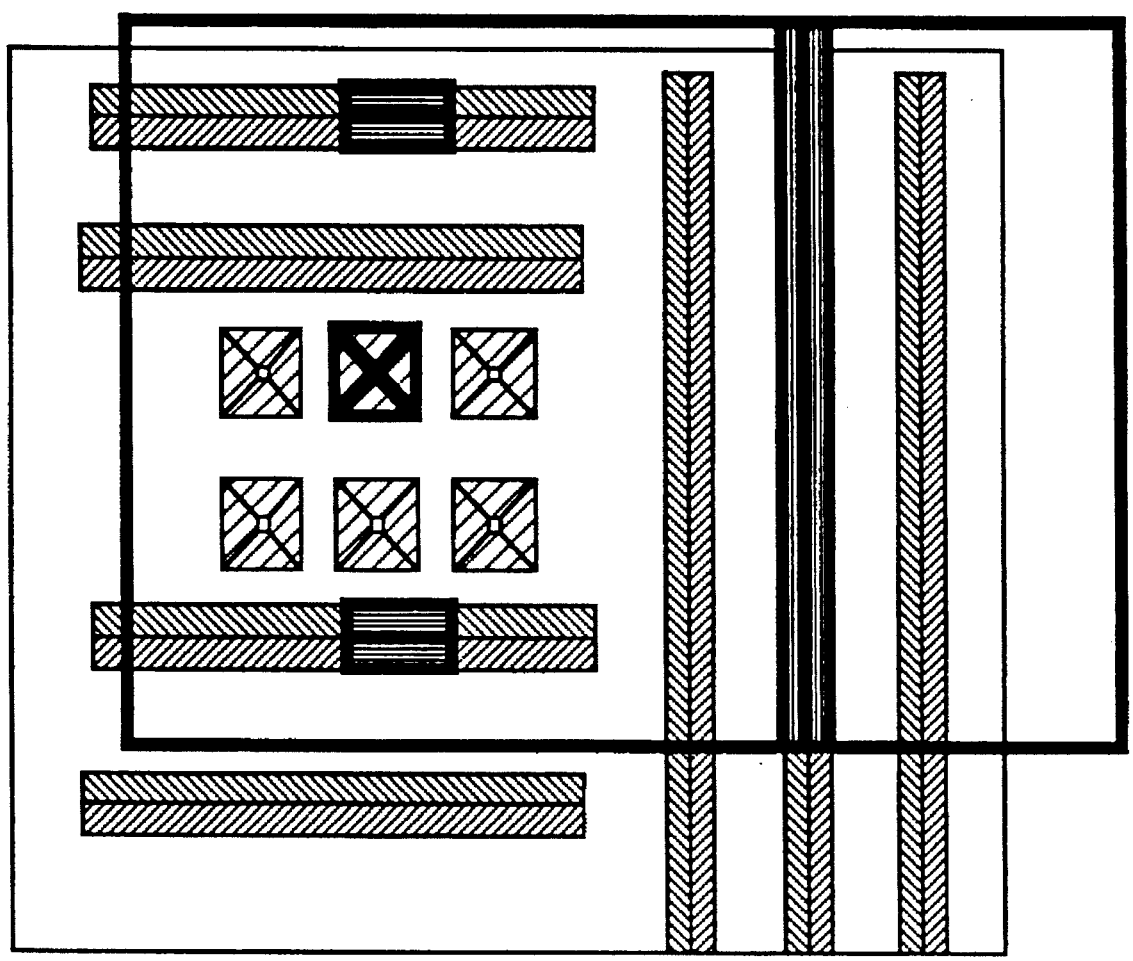
FIG. 36 illustrates that the two face-lock connector embodiments shown in FIG. 32 and FIG. 33 are face-locked in such a position as to align the upper middle through-hole of FIG. 32.

The concept of choosing among the multiple grooves 43, 44, and 45 in FIG. 25 through FIG. 29 may be slightly modified to realize an optical switching embodiment. A number of optical components (through-holes 68 through 73 for accommodating optical fibers 74 through 79 in this example), and a number of V-grooves 80 through 86 for face-lock positioning are fabricated on one connector part 87 as shown in FIG. 32. Side and front sectional views along the various axes indicated are shown. The other connector part 88, schematically illustrated in FIG. 33 using heavy lines, shows an optical component (a through-hole 89 for a fiber 90 in this example) and V-grooves 91, 92, and 93. FIG. 34 shows one possible mating position between the two connector parts 87 and 88, whereby the fiber 90 is aligned to the fiber 77. FIG. 35 shows another possible mating position, in which the fiber 90 is aligned to the fiber 74. FIG. 36 shows yet another possible mating position, in which the fiber 90 is connected to the fiber 75. In this way, one can select different mating positions among periodically-located face-lock features, accomplishing an optical switching from one fiber to another. A mechanical fiber optic switch can be manufactured by mechanizing the switching described herein.

Figure 33:
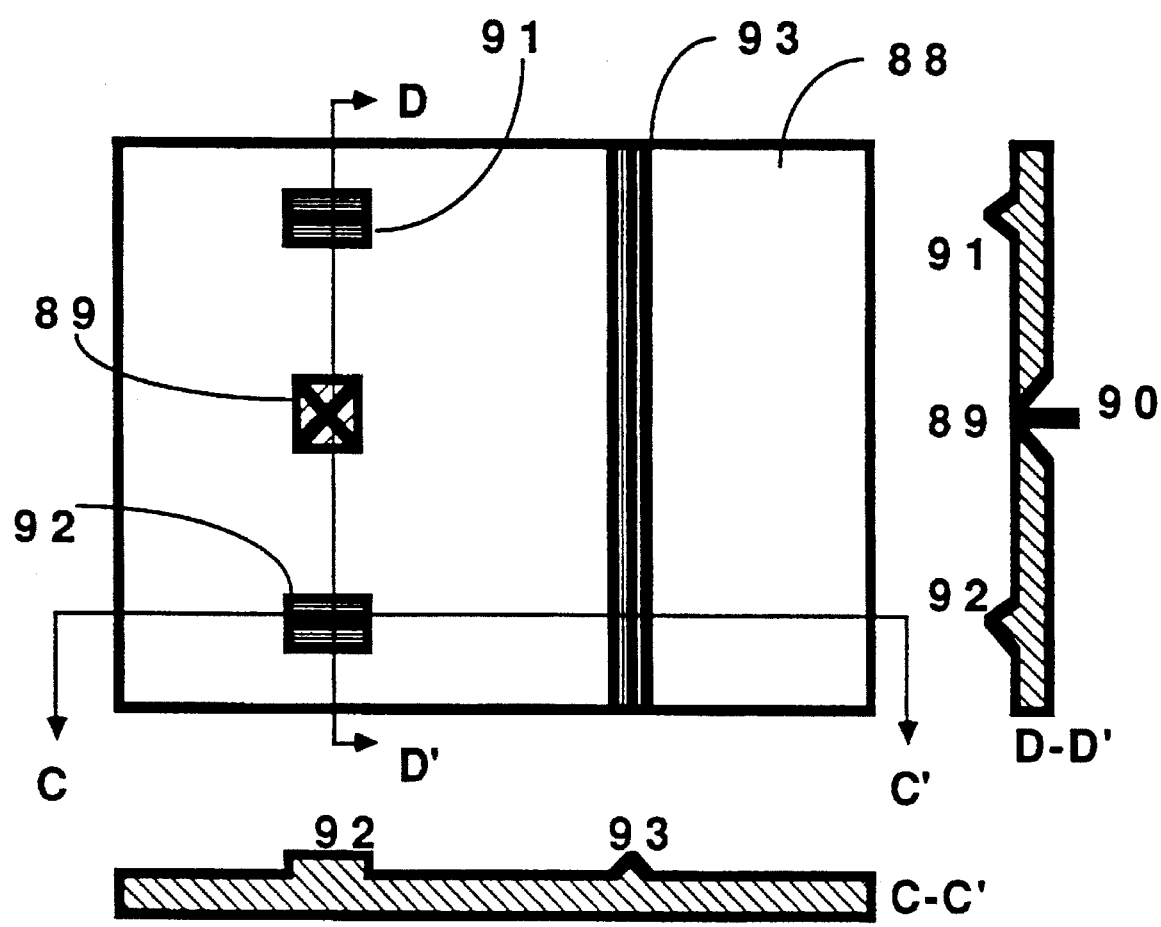
FIG. 33 shows, in heavy lines, a plan view, a side sectional view, and a front sectional view, of a connector embodiment with one through-hole and protruded V-grooves, for multi-positional face-lock alignment with the embodiment of FIG. 32.
Figure 37:
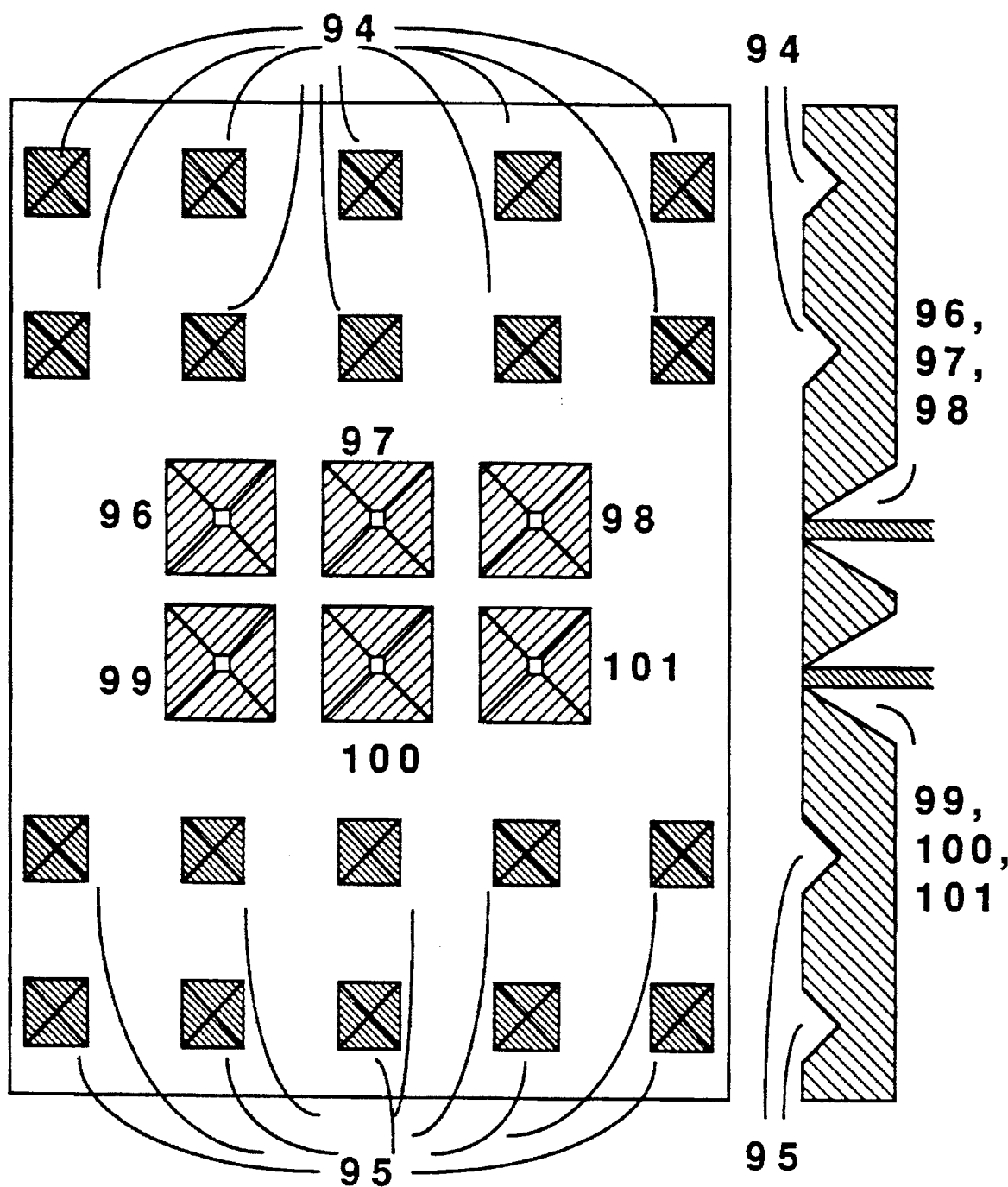
FIG. 37 shows a plan view and a side sectional view of a connector embodiment with through-holes for fibers and recessed V-squares in a periodic pattern.
Figure 38:
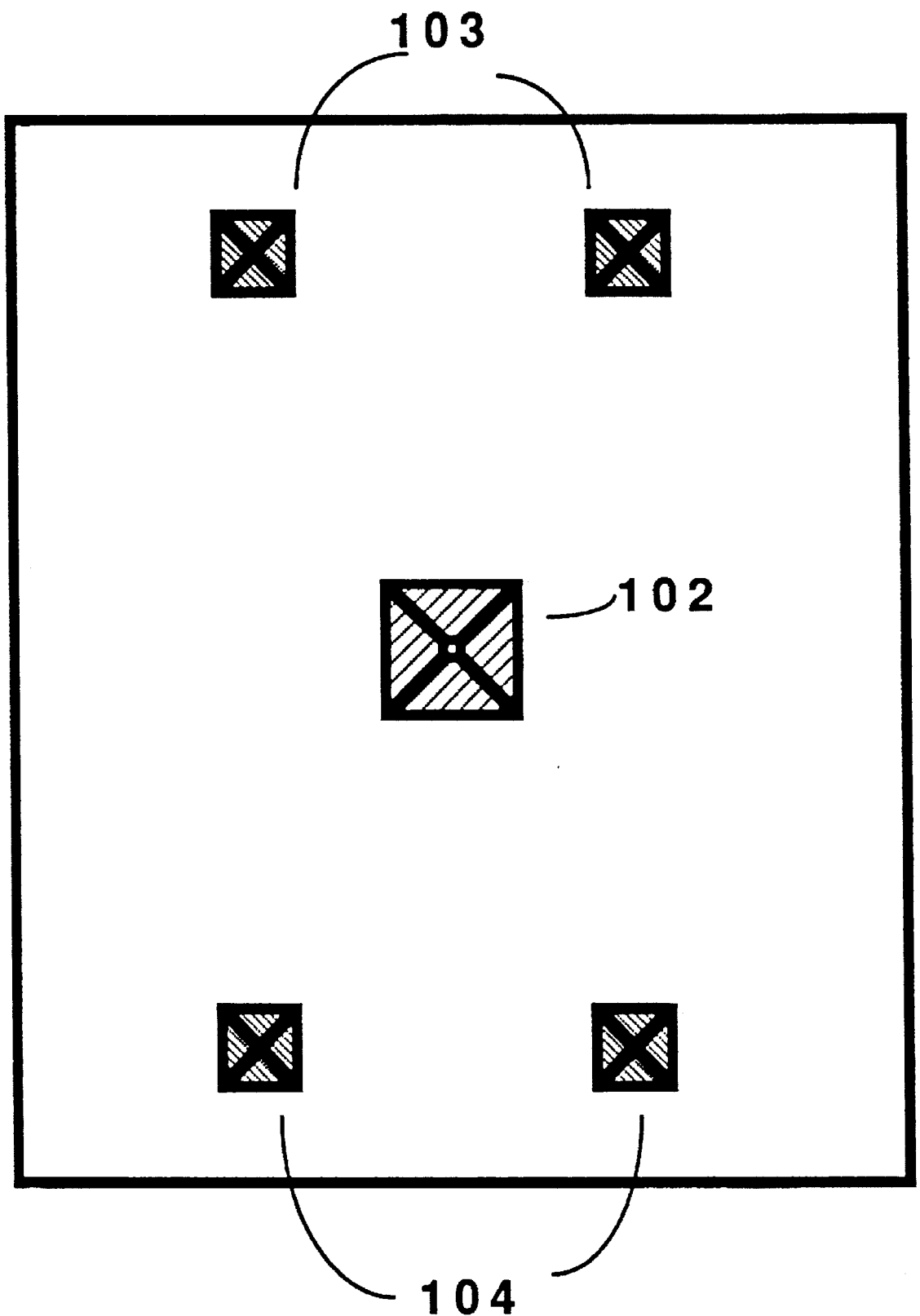
FIG. 38 shows, in heavy lines, a plan view, a side sectional view, and a front sectional view, of a connector embodiment with one through-hole and protruded V-squares, for multi-positional face-lock alignment with the embodiment of FIG. 37.
Figure 39:
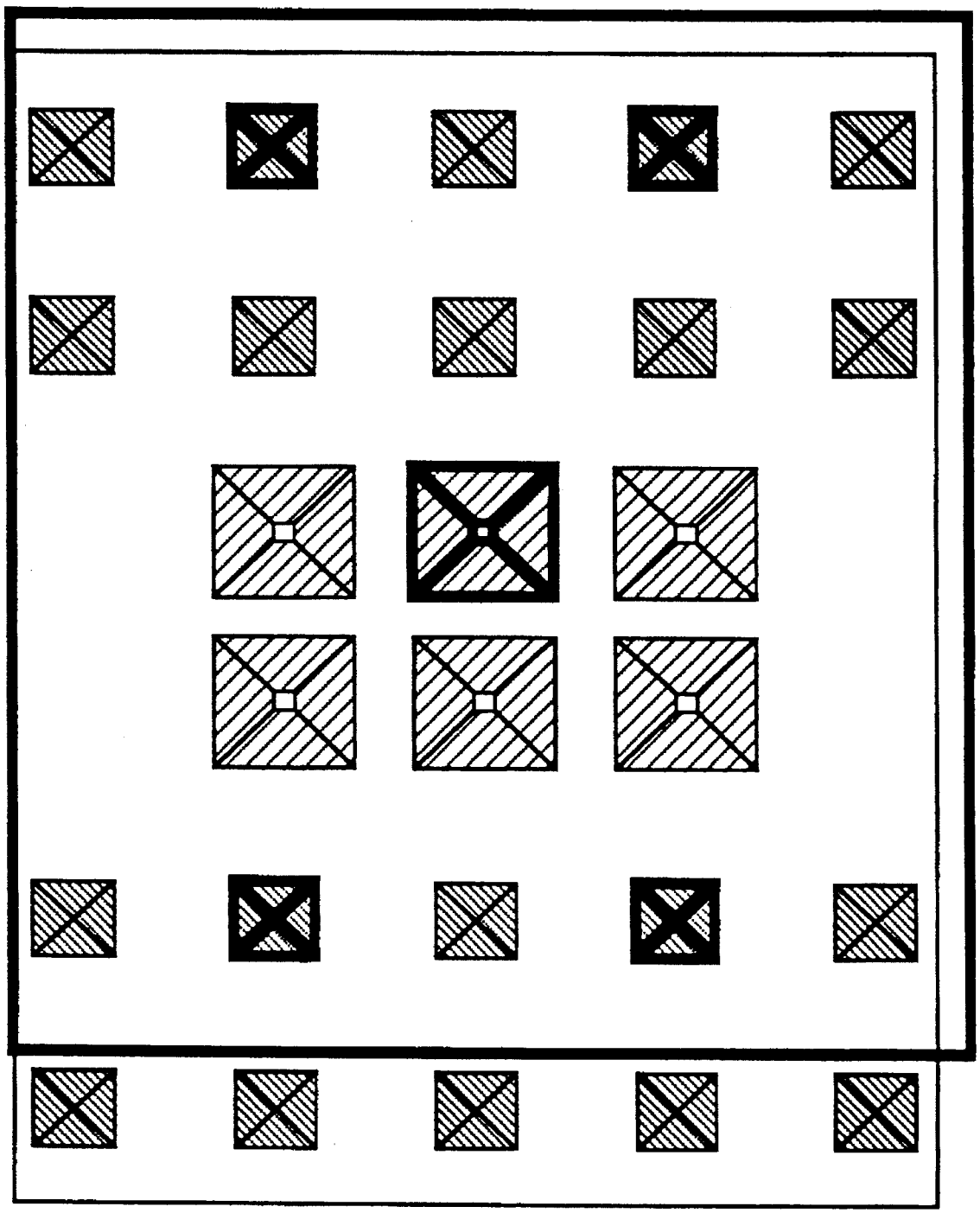
FIG. 39 illustrates that the two face-lock connector embodiments shown in FIG. 37 and FIG. 38 are face-locked in such a position as to align the upper middle through-hole of FIG. 37.
Figure 40:
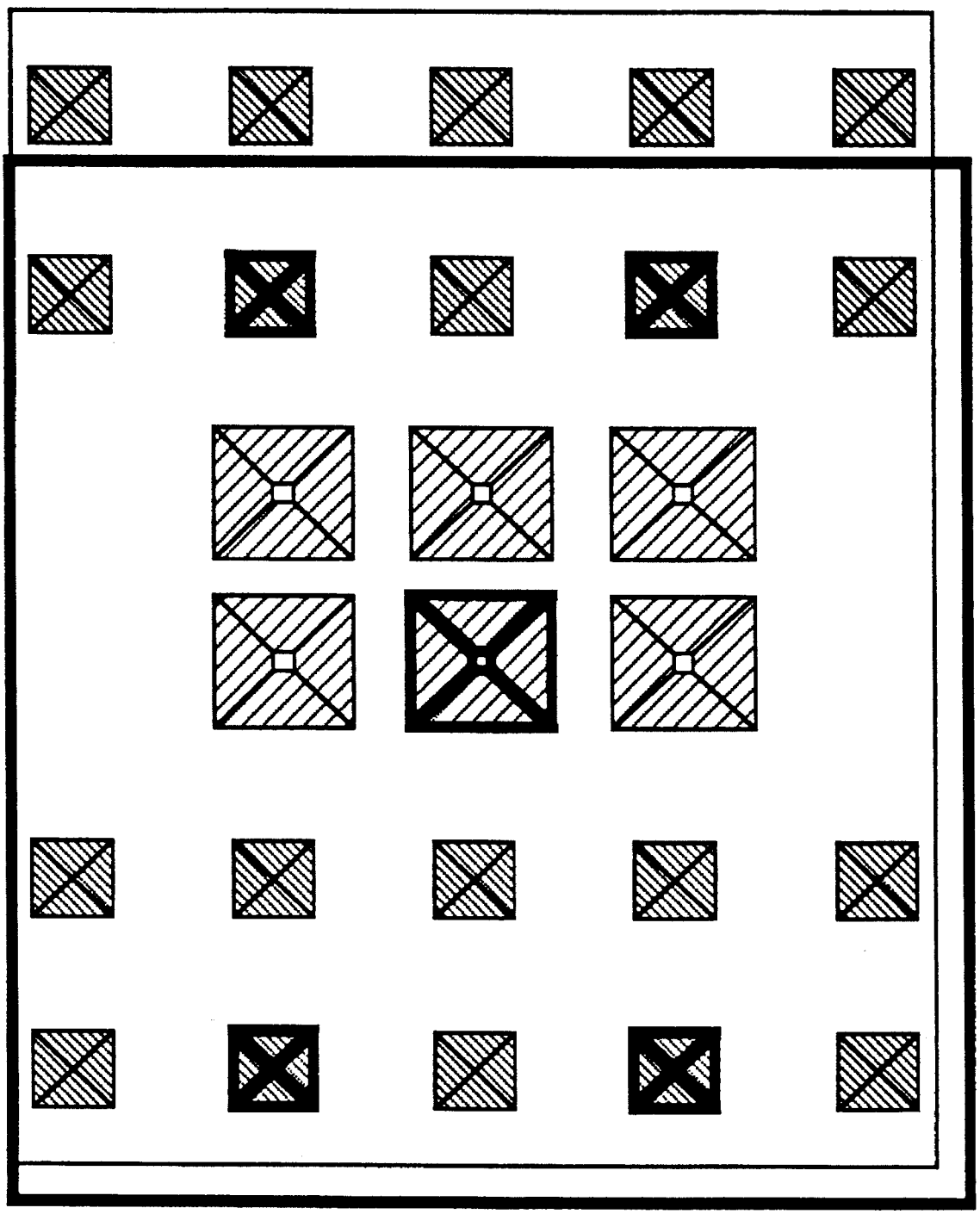
FIG. 40 illustrates that the two face-lock connector embodiments shown in FIG. 37 and FIG. 38 are face-locked in such a position as to align the lower middle through-hole of FIG. 37.
Figure 41:
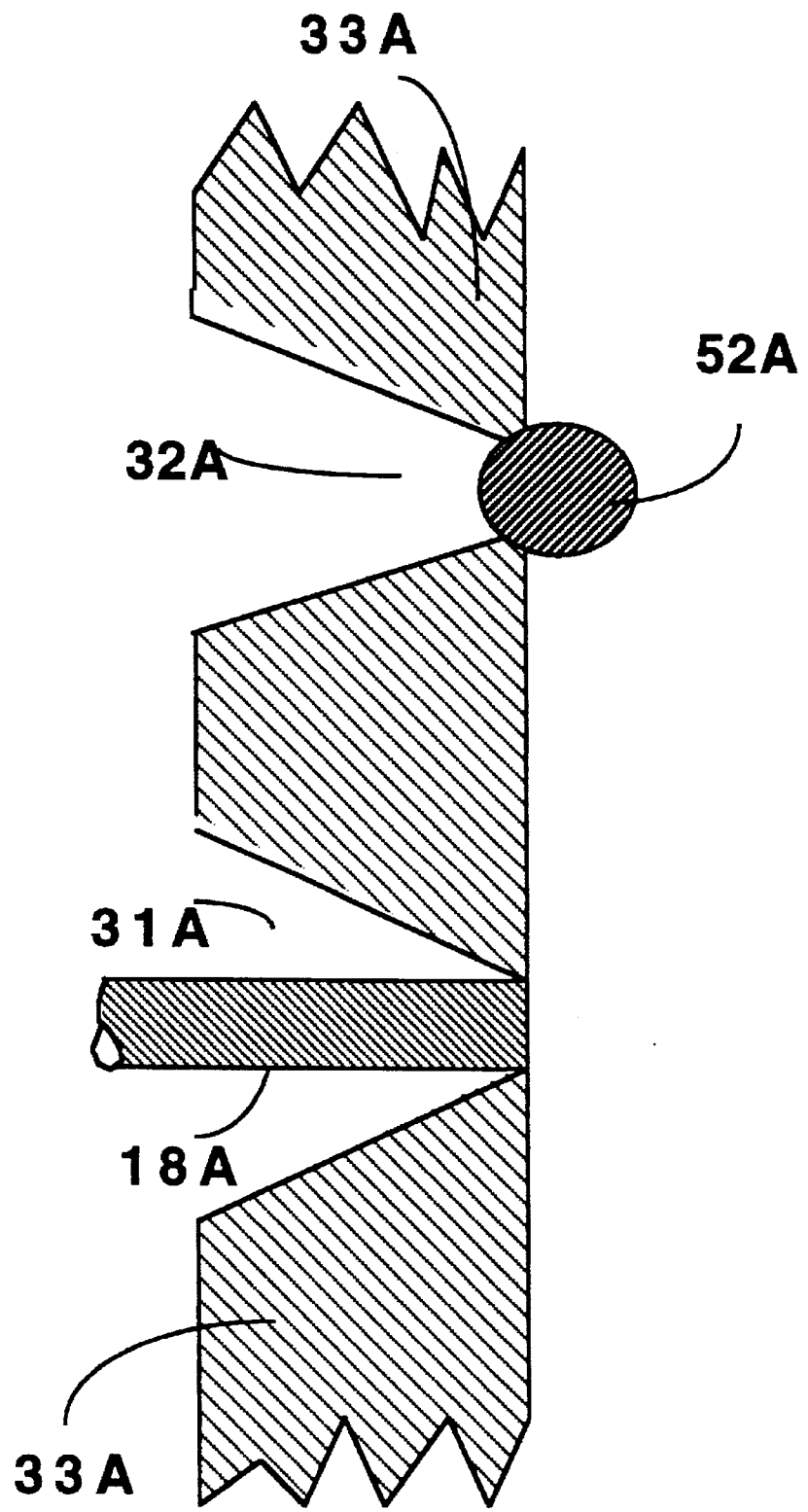
FIG. 41 shows a novel connector plug assembly in which a face-lock color is inserted inside the plug base as an integral part.

The face-lock V-grooves of FIG. 32 and FIG. 33 may be replaced by sets of V-squares 94 and 95, as shown in FIG. 37; and by sets of V-squares 103 and 104, as shown in FIG. 38. Matching the fiber 102 to one of the fibers among 96 through 101 can be accomplished by the same fashion, as depicted in FIGS. 39 through 42.

Obviously many modifications and variations of the present invention are possible in light of the above teachings. It is therefore to be understood that within the scope of the appended claims the invention may be practiced otherwise than as specifically described.

As noted earlier, the micromachined through-holes and their manufacturing methods will not be claimed in this application, but will be claimed in a separate, divisional patent application titled "Micromachined holes for optical fiber connection". This is because the micromachined through-holes and their manufacturing methods constitute novel features by their own rights, and may be used differently and without the surface-locking feature of the present invention. The micromachined through-holes and their manufacturing methods are described in the present invention only to clarify the face-lock embodiments of the present invention, and their advantages over the conventional means.

What is claimed and desired to be secured by Letters Patent of the United States is:

1. An optical interconnection means comprising;
   a first optical component;
   a first face-locking surface;
   a second optical component;
   and a second face-locking surface;
   wherein the first face-locking surface and the second face-locking surface are substantially planar, and the first optical component is located on the first face-locking surface, and the first face-locking surface has a first type of surface feature, and the first type of surface feature has an unique positional relationship with respect to the first optical component; and the second optical component is located on the second face-locking surface, and the second face-locking surface has the second type of surface feature that matches to the first type of feature so as to be locked in position to the first type of surface feature when pressed against the first face-locking surface in a face-to-face fashion, and the second type of surface feature has the same unique positional relationship with respect to the second optical component; whereas precise optical alignment between the first optical component and the second optical component is achieved through the face-locking of the two surface features and their unique positional relationship with respect to the first and the second optical components.

2. The invention according to claim 1 wherein the optical component is an optical channel waveguide.

3. The invention according to claim 1 wherein the optical component is a lens.

4. The invention according to claim 1 wherein the optical component is a light source.

5. The invention according to claim 1 wherein the optical component is an interference filter.

6. The invention according to claim 1 wherein the optical component is optically transparent.

7. The invention according to claim 1 wherein the first locking surface is planar, and the first type of surface contour includes a lithographically generated pattern.

8. The invention according to claim 7 wherein the first locking surface is made of a silicon crystal wafer.

9. The invention according to claim 8 wherein the silicon wafer is (100) type that allows a preferential V-groove etching.

10. The invention according to claim 9 wherein the dimension of the V-grooves are chosen in such a way that a cylindrical object may be inserted along the V-groove for aiding alignment by the surface locking.

11. The invention according to claim 1 wherein the optical component is an optical fiber.

12. The invention according to claim 2 wherein the end facet of the optical fiber resides on the first face-locking surface.

13. The invention according to claim 12 wherein the first face-locking surface is limited to the end facet of the optical fiber.

14. The invention according to claim 12 wherein the second face-locking surface resides on a surface of a face-lock insert that is insertable between the optical fiber and another optical component.

15. The invention according to claim 14 wherein the face-lock insert is a molded part.

16. The invention according to claim 14 wherein the face-lock insert is made by photolithographic techniques.

17. The invention according to claim 11 wherein the second face-locking surface includes the end facet of another optical fiber.

18. The invention according to claim 11 wherein the first face-locking surface includes the end-facet of a collar designed to slip over the optical fiber with a tight fit.

19. The invention according to claim 18 wherein the outside dimension of the collar is less than 0.5 mm.

20. The invention according to claim 11 wherein the optical fiber and the first face-locking surface resides inside the bore of a connector plug.

21. The invention according to claim 18 wherein the collar resides inside the bore of a connector plug.

22. The invention according to claim 20 wherein the end of the optical fiber is free to move inside the hole of the connector plug.

23. The invention according to claim 21 wherein the end of the collar is free to move inside the hole of the connector plug.

24. The invention according to claim 11 wherein the first type of contour is made of a photo-reactive material the characteristics of which is altered by a light exposure.

25. The invention according to claim 24 wherein the photoreactive material is an UV-curable polymer.

26. The invention according to claim 24 wherein the photoreactive material is a photoresist material.

27. The invention according to claim 11 wherein the first type of contour is according to the distribution of a dopant that is embedded in the first face-locking surface.

28. An arrayed optical interconnection means comprising;
   an array of a first optical component;
   a first face-locking surface;
   an array of a second optical component;
   and a second face-locking surface;
   wherein the first face-locking surface and the second face-locking surface are substantially planar, and the array of the first optical component is located on the first face-locking surface, and the first face-locking surface has a first type of surface feature, and the first type of surface feature has an unique positional relationship with respect to the array of the first optical component; and the array of the second optical component is located on the second face-locking surface, and the second face-locking surface has the second type of surface feature that matches to the first type of feature so as to be locked in position to the first type of surface feature when pressed against the first face-locking surface in a face-to-face fashion, and the second type of surface feature has the same unique positional relationship with respect to the array of the second optical component; whereas precise optical alignment between the array of the first optical component and the array of the second optical component is achieved through the face-locking of the two surface features and their unique positional relationship with respect to the array of the first and the second optical components.

* * * * *